(12) United States Patent
Willard, III et al.

(10) Patent No.: US 11,113,648 B2
(45) Date of Patent: *Sep. 7, 2021

(54) MULTI-LINE SYSTEM AND METHOD FOR RETRIEVING AND FULFILLING ITEMS IN A CUSTOMER ORDER

(71) Applicant: America's Collectibles Network, Inc., Knoxville, TN (US)

(72) Inventors: George F. Willard, III, Knoxville, TN (US); Lei Cao, Oak Ridge, TN (US); Dustin W. Cole, Louisville, TN (US); Mahendra Satrasala, Knoxville, TN (US); David Byrd, Maryville, TN (US); G. Shannon Meade, Knoxville, TN (US); Bradley K. Waller, Lenoir City, TN (US)

(73) Assignee: America's Collectibles Network, Inc., Knoxville, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/773,821

(22) Filed: Jan. 27, 2020

(65) Prior Publication Data
US 2020/0272970 A1 Aug. 27, 2020

Related U.S. Application Data

(63) Continuation-in-part of application No. 16/727,676, filed on Dec. 26, 2019, which is a
(Continued)

(51) Int. Cl.
*G06Q 10/00* (2012.01)
*G06Q 10/06* (2012.01)
(Continued)

(52) U.S. Cl.
CPC ..... *G06Q 10/06316* (2013.01); *B65G 1/1371* (2013.01); *B65G 1/1375* (2013.01);
(Continued)

(58) Field of Classification Search
None
See application file for complete search history.

(56) References Cited

U.S. PATENT DOCUMENTS 7,346,564 B1 * 3/2008 Kirklin ................ G06Q 10/087
705/26.1
7,739,138 B2 * 6/2010 Chauhan ................ G06Q 10/06
705/7.14

(Continued)

OTHER PUBLICATIONS

Zhao, X. (2011). A business process driven approach for automatic generation of business applications (Order No. NR78480). Available from ProQuest Dissertations and Theses Professional. (Year: 2011).*

(Continued)

*Primary Examiner* — Gurkanwaljit Singh
(74) *Attorney, Agent, or Firm* — Nelson Mullins Riley & Scarborough LLP; Anthony A. Laurentano

(57) ABSTRACT

The customer order fulfillment system includes an order collection unit for collecting information associated with a plurality of customer orders having items and generating customer order data. Each of the plurality of customer order includes one or more items associated therewith. An order generating unit for receiving the customer order data and generating in response consolidated order fulfillment data, a pick tour generating subsystem for receiving the consolidated order fulfillment data and in response thereto generating pick tour instructions associated with a pick tour, and a bulk pick order fulfillment unit for grouping together similar ones of the items associated with the plurality of customer orders to form a plurality of bulk picks. An
(Continued)

automated fulfillment system receives the consolidated order fulfillment data from the order generating unit and automatically selects one or more of the items from one or more carousels, employing the pick tour or the bulk pick.

33 Claims, 17 Drawing Sheets

Related U.S. Application Data continuation-in-part of application No. 16/514,897, filed on Jul. 17, 2019.

(60) Provisional application No. 62/700,619, filed on Jul. 19, 2018.

(51) Int. Cl.
| | | |
|---|---|---|
| *G06Q 30/06* | (2012.01) | |
| *G06Q 10/08* | (2012.01) | |
| *G06Q 10/10* | (2012.01) | |
| *G06F 16/901* | (2019.01) | |
| *G06F 16/29* | (2019.01) | |
| *B65G 1/137* | (2006.01) | |
| *G06Q 10/04* | (2012.01) | |
| *G06F 3/12* | (2006.01) | |

(52) U.S. Cl.
CPC .......... *G06F 16/29* (2019.01); *G06F 16/9024* (2019.01); *G06F 16/9027* (2019.01); *G06Q 10/047* (2013.01); *G06Q 10/06315* (2013.01); *G06Q 10/083* (2013.01); *G06Q 10/0875* (2013.01); *G06Q 10/10* (2013.01); *G06Q 30/0635* (2013.01); *G06F 3/1296* (2013.01)

(56) References Cited

U.S. PATENT DOCUMENTS

| | | | | |
|---|---|---|---|---|
| 7,853,492 B1* | 12/2010 | Kirklin | ................ | G06Q 10/087 705/28 |
| 8,175,925 B1* | 5/2012 | Rouaix | ................ | G06Q 20/20 705/22 |
| 8,401,975 B1* | 3/2013 | Tian | ................ | G06Q 10/08 705/335 |
| 8,407,110 B1* | 3/2013 | Joseph | ................ | G06Q 30/0633 705/28 |
| 9,466,045 B1* | 10/2016 | Kumar | ................ | G06Q 10/087 |
| 9,602,381 B1* | 3/2017 | Jordan | ................ | G06Q 10/08 |
| 10,489,802 B1* | 11/2019 | Zhdanov | ............ | G06Q 30/0202 |
| 2008/0301009 A1* | 12/2008 | Plaster | ................ | G06Q 10/087 705/28 |
| 2011/0055289 A1* | 3/2011 | Ennis | ................ | G06Q 10/06 707/805 |
| 2011/0261049 A1* | 10/2011 | Cardno | ................ | G06Q 10/10 345/419 |
| 2014/0040075 A1* | 2/2014 | Perry | ................ | G06Q 30/0635 705/26.81 |
| 2016/0217399 A1* | 7/2016 | Roelofs | ............ | G06Q 10/08355 |
| 2019/0213530 A1* | 7/2019 | Wolf | ................ | G06Q 10/043 |
| 2020/0265381 A1 | 8/2020 | Willard, III et al. | | |
| 2020/0311644 A1 | 10/2020 | Willard, III et al. | | |

OTHER PUBLICATIONS

Kim, B. S. (2009). Dynamic slotting and cartonization problem in zone-based carton picking systems (Order No. 3394621). Available from ProQuest Dissertations and Theses Professional (Year: 2009).*

Ow Yong, M. G. (2009). Order batching design fora modular fulfillment center (Order No. 3418241). Available from ProQuest Dissertations and Theses Professional (Year: 2009).*

Frazelle, E. H. (1989). Stock location assignment and order picking productivity (Order No. 9120762). Available from ProQuest Dissertations and Theses Professional (Year: 1989).*

Van den Berg, Jeroen P., and Willem HM Zijm. "Models for warehouse management: Classification and examples." International journal of production economics 59.1-3 (1999): 519-528. (Year: 1999).*

Accorsi, Riccardo, Riccardo Manzini, and Fausto Maranesi. "A decision-support system for the design and management of warehousing systems." Computers in Industry 65.1 (2014): 175-186. (Year: 2014).*

* cited by examiner

Bulk Pick Ticket

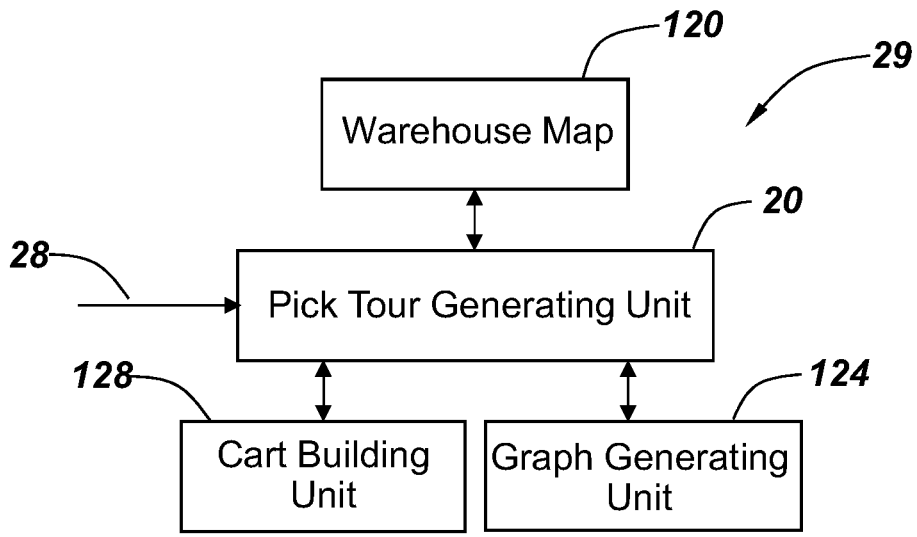
FIG. 8
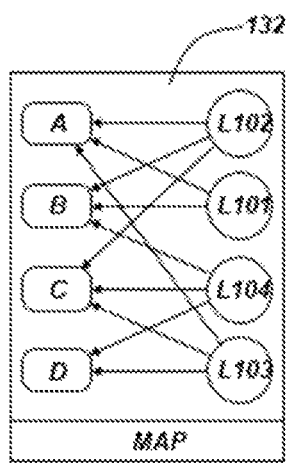 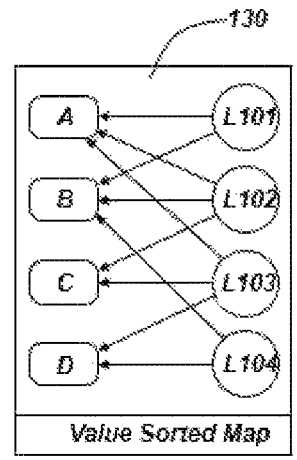
FIG. 9A  FIG. 9B

MULTI-LINE SYSTEM AND METHOD FOR RETRIEVING AND FULFILLING ITEMS IN A CUSTOMER ORDER

RELATED APPLICATIONS

The present application is a continuation-in-part patent application of U.S. patent application Ser. No. 16/727,676, filed on Dec. 26, 2019 and entitled SYSTEM AND METHOD FOR PERFORMING BULK PICK OF ITEMS OF A CUSTOMER ORDER, which in turn is a continuation-in-part patent application of U.S. patent application Ser. No. 16/514,897, entitled SYSTEM AND METHOD FOR PERFORMING BULK PICK OF ITEMS OF A CUSTOMER ORDER, filed on Jul. 17, 2019, which claims priority to provisional patent application Ser. No. 62/700,619, filed on Jul. 19, 2018, and entitled SYSTEM AND METHOD FOR PERFORMING BULK PICK OF ITEMS OF A CUSTOMER ORDER. The contents of all of the foregoing are incorporated herein by reference.

BACKGROUND OF THE INVENTION

Vendors, particularly in home shopping industries involving telephone ordering, mail ordering, or e-commerce, often need to fulfill and package customer orders to be shipped to customers. The customer order may include one or more product items, as well as promotional literature. In some circumstances, product fulfillment and packaging may be done manually with a worker picking items corresponding to the customer order from a fulfillment center or warehouse and then inserting orders into packages. In order to increase efficiency over conventional manual picking and packaging techniques, automated picking stations and packing machines have been introduced. However, such picking processes are designed to have a person simply pick an item from a selected location and then transfer the item to a packing station for packaging, without regard to optimizing the pick route or picking and packaging process.

Further, conventional item picking and packaging systems require large capital investments, and still are not fully adapted to optimize the item picking and packaging process.

SUMMARY OF THE INVENTION

The present invention is directed to an order fulfillment system that receives and processes customer orders, and then determines whether the specific items in the collected customer orders warrant the creation and execution of a bulk pick or a pick tour to be executed by a pick agent. If the system determines that a series of pick tours are required, the pick tour subsystem receives information from the order collection unit, determines the location of the items in the warehouse based on a warehouse map, instructs the pick agent how to manage or setup a mobile pick cart, generates a value sorted tree map, and then generates a pick tour plan. The pick tour plan is then converted into a pick tour to be performed by the pick tour agent. In the pick tour, the location of the items in the warehouse are proved to the pick agent and the pick tour agent is instructed to select the items at specific locations in a predefined sequence.

The customer order fulfillment system of the present invention includes an order collection unit for collecting information associated with a plurality of customer orders from a plurality of customers and generating customer order data that includes data associated with each of the plurality of customer orders and the plurality of customers, wherein each of the plurality of customer order includes one or more items associated therewith; an order generating unit for receiving the customer order data from the order collection unit and generating in response thereto consolidated order fulfillment data; and a pick tour generating subsystem for receiving the consolidated order fulfillment data from the order generating unit and in response thereto generating pick instructions associated with a pick tour plan or a pick tour from the consolidated order fulfillment data. Further, the order fulfillment system includes a bulk pick order fulfillment unit for receiving the consolidated order fulfillment data from the order generating unit and grouping together similar ones of the items associated with the plurality of customer orders to form a plurality of bulk picks, wherein one or more of the plurality of bulk picks can form part of one or more bulk pick tours, and an automated fulfillment system for receiving the consolidated order fulfillment data from the order generating unit and for automatically selecting one or more of the items in the customer order from one or more carousels. The automated fulfillment system is configured for receiving the pick tour plan or the pick tour and for automatically selecting the items in the customer order set forth in the pick tour plan or the pick tour from the one or more carousels, and/or is configured for receiving one or more of the plurality of bulk picks for automatically selecting one or more of the items in the customer order from the one or more carousels.

The pick tour generating subsystem comprises a map unit for storing a map having map data associated therewith that corresponds to a location for each of the items in a warehouse; a cart building unit for generating information associated with a mobile cart for use by a pick agent, wherein the mobile cart has a plurality of totes associated therewith and wherein each of the plurality of totes includes identification information; a graph generating unit for generating a value sorted tree graph by employing a value sorted tree mapping technique based on the map data and the consolidated order fulfillment data, and wherein the value sorted tree graph includes data associating one or more of the items from the plurality of customer orders with a selected location in the warehouse; and a pick tour generator for generating a pick tour plan based on the value ordered tree graph and the map data, wherein the pick tour plan correlates items of the customer orders at multiple selected locations in the warehouse with one or more of the plurality of totes in the mobile cart. The cart building unit determines the number of the totes for the mobile cart and the identification information associated with each of the plurality of totes based on the pick tour plan.

According to another aspect of the invention, one or more of the plurality of totes includes a plurality of sub-compartments where each of the plurality of sub-compartments includes identification information. The totes can be arranged on the mobile cart according to the requirements of the pick tour plan and optionally according to the sequence of the locations of the items in the warehouse.

According to another aspect of the invention, the value sorted tree graph is an associative array data type having values associated therewith, wherein the value sorted tree graph sorts the values in a selected order. The values correspond to the locations in the warehouse or to a number of the items at the locations in the warehouse. Further, the locations within the warehouse include one or more bays associated with each location in the warehouse, and the pick tour plan comprises plan data correlating the location of the bay with selected ones of the items at the locations of the bays to be placed in specific totes in the mobile cart.

According to still another aspect of the invention, the pick tour plan is generated by the pick tour generator by mapping the consolidated order fulfillment data generated by the order generating unit with the warehouse configuration stored in the map unit via the graph generating unit. The pick tour generator converts the pick tour plan into a pick tour that sets forth an ordered list of pick tasks. Further, each of the pick tasks includes a selected one of the following: the location of the bay, identification information associated with the location of the bay, shipping information associated with one or more of the customer orders, a quantity of the items, identification information associated with each of the items, one or more of the items to be picked from the bay, and the tote on the mobile cart in which to place the picked items. The pick tour generator generates the pick tour based on a similarity in the customer orders and the location of the items in the warehouse.

According to yet another aspect of the invention, the system further includes a bulk pick order fulfillment unit for receiving the consolidated order fulfillment data from the order generating unit and grouping together similar ones of the items associated with the plurality of customer orders to form a plurality of bulk picks, wherein one or more of the plurality of bulk picks can form part of one or more bulk pick tours. The bulk pick order fulfillment unit groups the items in the consolidated order fulfillment data into shipments according to one or more predetermined logical parameters. Still further, the bulk pick order fulfillment unit includes processing hardware that is configured to map the one or more items in each of the plurality of customer orders to product identification data, generate one or more bulk picks having associated therewith one or more bulk pick recipes from the data associated with the customer orders, wherein each of the bulk pick recipes includes a selected quantity of the one or more items from the plurality of customer orders and a selected quantity of one or more additional items, and generate a bulk pick ticket associated with each of the bulk picks.

The bulk pick ticket includes information about the one or more items in the bulk pick recipe, and location information associated with the location of the one or more items in the warehouse. The bulk pick order fulfillment unit generates a connected graph of groupings of the items from the customer orders and the one or more additional items, wherein the items from the customer orders and the additional items form nodes of the connected graph.

According to another aspect of the invention, the system can also include a packing and shipping sub-system for packing and shipping the items from the customer orders, as well as a controller for scheduling one or more selected time periods for performing the bulk pick tour or the pick tour.

The present invention is also directed to a method for retrieving items from a customer order from a warehouse so as to fulfill a customer order, comprising collecting information associated with a plurality of customer orders from a plurality of customers and generating customer order data that includes data associated with each of the plurality of customer orders and the plurality of customers, wherein each of the plurality of customer order includes one or more items associated therewith; generating in response to the customer order data consolidated order fulfillment data; and receiving the consolidated order fulfillment data and generating pick tour instructions associated with a pick tour from the consolidated order fulfillment data by a pick tour generating subsystem.

The method also includes receiving the consolidated order fulfillment data from the order generating unit and grouping together similar ones of the items associated with the plurality of customer orders to form a plurality of bulk picks with the bulk pick order fulfillment unit, wherein one or more of the plurality of bulk picks can form part of one or more bulk pick tours, and receiving the consolidated order fulfillment data from the order generating unit and for automatically selecting one or more of the items in the customer order from one or more carousels with the automated fulfillment system. The automated fulfillment system is configured for receiving the pick tour plan or the pick tour and for automatically selecting the items in the customer order set forth in the pick tour plan or the pick tour from the one or more carousels, and is configured for receiving one or more of the plurality of bulk picks for automatically selecting one or more of the items in the customer order from the one or more carousels.

According to another aspect of the invention, the method includes generating the pick tour plan by mapping the consolidated order fulfillment data generated by the order generating unit with the warehouse configuration stored in the map unit via the graph generating unit. The method can also include converting with the pick tour generator the pick tour plan into a pick tour that sets forth an ordered list of pick tasks.

According to still another aspect of the invention, the method also includes a bulk pick order fulfillment unit for receiving the consolidated order fulfillment data from the order generating unit and grouping together similar ones of the items associated with the plurality of customer orders to form a plurality of bulk picks, wherein one or more of the plurality of bulk picks can form part of one or more bulk pick tours. The method can also include grouping the items in the consolidated order fulfillment data into shipments according to one or more predetermined logical parameters.

BRIEF DESCRIPTION OF DRAWINGS

These and other features and advantages of the present invention will be more fully understood by reference to the following detailed description in conjunction with the attached drawings in which like reference numerals refer to like elements throughout the different views. The drawings illustrate principals of the invention and, although not to scale, show relative dimensions.

FIG. 8 is a schematic block diagram illustrating the pick tour generating unit and associated components according to the teachings of the present invention.

FIG. 9A is a schematic representation of a conventional unsorted tree map generated according to known techniques.

FIG. 9B is a schematic representation of a value sorted tree map generated by the graph generating unit according to the teachings of the present invention.

DETAILED DESCRIPTION

Exemplary embodiments of the present invention address these and other problems associated with the picking of items corresponding to a customer order by employing an order fulfillment system for picking the items and then packaging and shipping the items to the customer.

The present invention is directed to a time based customer ordering and customer order consolidation system suitable for use in an automated or partially automated order fulfillment environment. The customer order can include one or more items that the customer has selected or purchased, and can if desired include additional items, such as warranty information, sales or promotional literature and related brochures, item instructions and the like.

Figure 1:
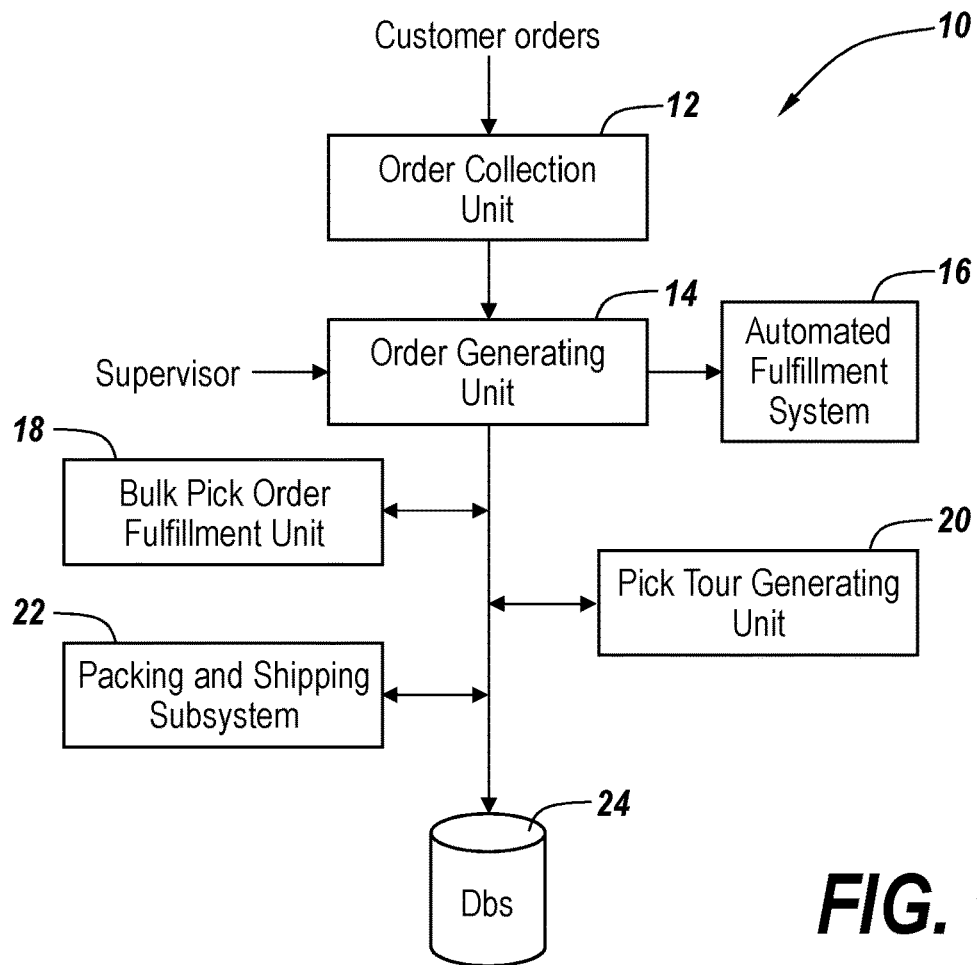
FIG. 1 is a schematic block diagram of the order fulfillment system of the present invention.

As shown in FIG. 1, the order fulfillment system 10 of the present invention includes an order collation or collection unit 12 for collecting or collating customer orders as they are entered into the system. As is known in the art, the customer orders can be introduced or entered into the system either through the Internet via a website ordering operation or can be entered into the system by a customer service representative while accepting order instructions directly from the customer, such as over a telephone. The customer order collection unit 12 in connection with the database 24 can generate customer and order information or data that is transmitted and received by an order generating unit 14. The order collection unit 12 consolidates the incoming customer orders and organizes and consolidates selected order and customer information from the customer orders, including for example the customer ID, the shipment address, type of shipment, number of items in the customer order, and the like. This information can be stored at one or locations, including for example the database 24. The order generating unit 14 is configured for controlling and managing the order data for fulfillment at a warehouse in a time based manner. As used herein, the term "warehouse" is intended to include any facility or building that stores items therein for retrieval by personnel for subsequent shipping to, for example, a customer or another building. The warehouse can include for example a fulfillment facility. The order data is preferably organized and managed by the order generating unit 14 so as to optimize the selection (e.g., picking) of the items in the customer order and then shipping the items to the customer in an expeditious manner.

The order generating unit 14 can be monitored by a separate computing system and/or a warehouse supervisor via the computing system to determine the order fulfillment actions that need to be taken. The order generating unit 14 is adapted or configured to prepare a set of order fulfillment instructions or data for fulfilling the incoming customer orders in a time based manner. The fulfillment order instructions can be based on a set of logical rules and ordering priorities for releasing one or more customer orders to be fulfilled by the order fulfillment system 10.

Figure 17:
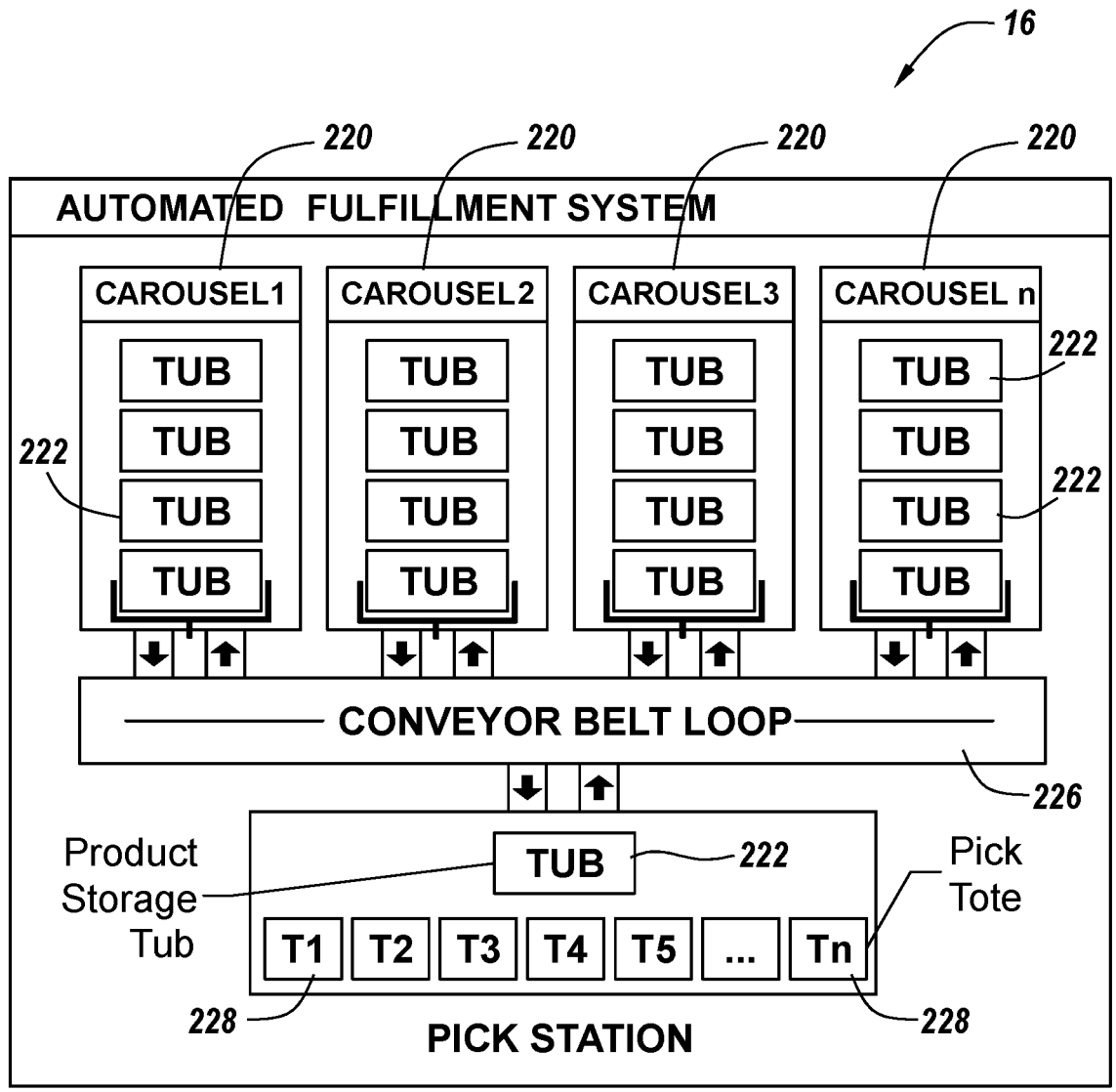
FIG. 17 is a schematic representation of the automated fulfillment system of the present invention.

The consolidated order fulfillment instructions or data generated by the order generating unit 14 can be transmitted to an automated fulfillment system 16, such as an automated product picking system, as shown for example in FIG. 17. An example of an automated product picking system suitable for use with the present invention includes the systems manufactured and sold by SSI Schaefer, Germany. As is known in the art, the automated fulfillment system 16 can include a series of vertical towers or stacks that include a number of distinct receptacles for storing one or more items. The stacks can be stationary or adapted to rotate about a central longitudinal axis. The stacks can be coupled to one or more movable retrieval arms or mechanisms that are adapted to move vertically along the stacks and if desired between the stacks. The items or products retrieved by the movable arms can be placed in one or more totes or bins, which in turn can be moved or conveyed along a conveyance system. The conveyance system can include tracks with rollers and the like. The automated fulfillment system 16 can be controlled or operated by a central or a dedicated computing system.

Alternatively, the order generating unit 14 can transmit the order fulfillment instructions to a bulk pick order fulfillment unit 18. For example, according to one practice, the order generating unit 14 can be configured to group together a set of customer orders that share similar features, items or traits, into a larger bulk pick order, and the bulk pick order data can be transmitted to the bulk pick order fulfillment unit 18. Alternatively, the bulk pick order fulfillment unit 18 can generate the bulk pick data. The bulk pick orders (e.g., a bulk pick order wave) are groupings of customer orders that may be picked or fulfilled in a warehouse in aggregate as opposed to fulfilling each customer order independently. As such, warehouse data can include the configuration of the warehouse, which can include for example rows of storage racks with associated storage bins, and data associated with specific items located in specific bins at specific warehouse locations, can be stored in the database 24 or elsewhere in the system 10 and is accessible by the order generating unit 14, the bulk pick order fulfillment unit 18 and the pick tour generating unit 20. The bulk pick orders forming the bulk pick wave are selected so as to optimize the fulfillment process by selecting orders that have certain features, items or traits in common. The bulk pick order fulfillment unit 18 can generate data associated with a bulk pick that can form part of a bulk pick tour or wave, and which can be fulfilled by the automated product picking system 16, by one or more mobile operators or pick agents that manually pick one or more items corresponding to the bulk pick tour, or by both. As used herein, the term "bulk pick," "bulk pick tour," or "bulk pick wave," is intended to mean a plurality of similar or identical items that are grouped or bulked together and which can be selected based on the warehouse data from a selected warehouse location. The bulk picks or grouped items when assigned to the automated fulfillment system and/or to a pick tour agent for retrieval form the bulk pick tours. The bulk picks or bulk pick tours can then be assigned to the pick agents and/or to the automated fulfillment unit separately, concurrently or in series to form a bulk pick wave.

Additionally or alternatively, the order generating unit 14 can interface with a pick tour generating unit 20, which receives the order fulfillment instructions from the order generating unit 14. The pick tour generating unit 20 can generate pick tour instructions for a single item or a multi-item order. The pick tour instructions can be forwarded to the automated product picking system and/or to a pick tour mobile operator for performing a pick tour. The pick tour generating unit 20 generates pick tour instructions based on the consolidated customer order information received from the order generating unit 14. The pick tour instructions leverage the similarity in customer orders and item locations within the warehouse so as to minimize the amount of time it takes to pick the one or more items that comprise the customer order. The pick tour instructions can generate or be converted into a pick tour that can be assigned to pick agents or mobile operators. The pick agents can utilize a mobile cart that has selected compartments associated therewith to manually pick or select the items that correspond to the customer orders from the warehouse. The pick agent can employ a handheld scanning device, such as for example the conventional handheld scanners sold by Intermec, that can guide the pick agent to the selected location of the item and assist the pick agent in selecting the correct item. The handheld device also serves to allow the order fulfillment system 10 to track and verify the location of the pick agent, and to perform product and location verification in real time. As used herein, the term "pick tour" is intended to mean a series of instruction that include one or more pick tasks that when aggregated or consolidated together form a tour. The tour is in essence a series of instructions sent to the pick agent to pick, select or retrieve one or more items associated with one or more customer orders from selected locations within the warehouse. Alternatively, the pick tour can be performed by the automated fulfillment system 16, which receives the aggregated list of items (or tour) from the pick tour generating unit and retrieves the items from selected locations within the automated fulfillment system.

Once the customer order have been picked and fully assembled, the contents of the order can be assembled into totes or compartments of totes, which are then placed on a conveyor belt and sent to a packing and shipping subsystem 22. A packaging and shipping subsystem suitable for use with the present invention includes the packing station disclosed in U.S. Publ. No. 2014/0360141, to the assignee hereof, the contents of which are herein incorporated by reference. In transit, the order fulfillment system 10 can also include structure for automatically printing a customer invoice and/or packing slips for insertion within the corresponding compartment within the tote. The illustrated packing and shipping subsystem 22 receives the totes and packages the contents of each compartment of the tote for shipping to the customer.

As shown, the illustrated order fulfillment system 10 can also include a general database 24 for storing information concerning the customer orders as well as selected information corresponding to each of the illustrated units and subsystems. Specifically, the database 24 can store customer information, including customer name, address, financial payment details, order history and the like. The database 24 can also store information regarding the items that are stored in the warehouse as well as the warehouse information. The item information can include details of each item, including item type, description, price, quantity and the like. The database can also be configured to store information regarding the programs and associated segments or plays that are broadcast, as well as the sequence of items that are displayed and discussed during the program.

The order generating unit 14 of the present invention is configured to collect data associated with the customer orders and prepare a set of order fulfillment instructions for fulfilling the incoming customer orders in a time based manner. The order fulfillment instructions can be based on a set of logical rules and ordering priorities for releasing one or more customer orders to be fulfilled by the order fulfillment system 10. The order generating unit 14, based on the number of customer orders, and the overlap or similarity between the items in the orders, can send instructions to the bulk pick order fulfillment unit 18 to execute a bulk pick of selected items. The order generating unit 14 or the bulk pick order fulfillment unit 18 can schedule the bulk pick at a time of day that is convenient based on the total number of customer orders being handled, the time of day, the number of pick agents assigned to the warehouse floor, and the like.

Figure 7:
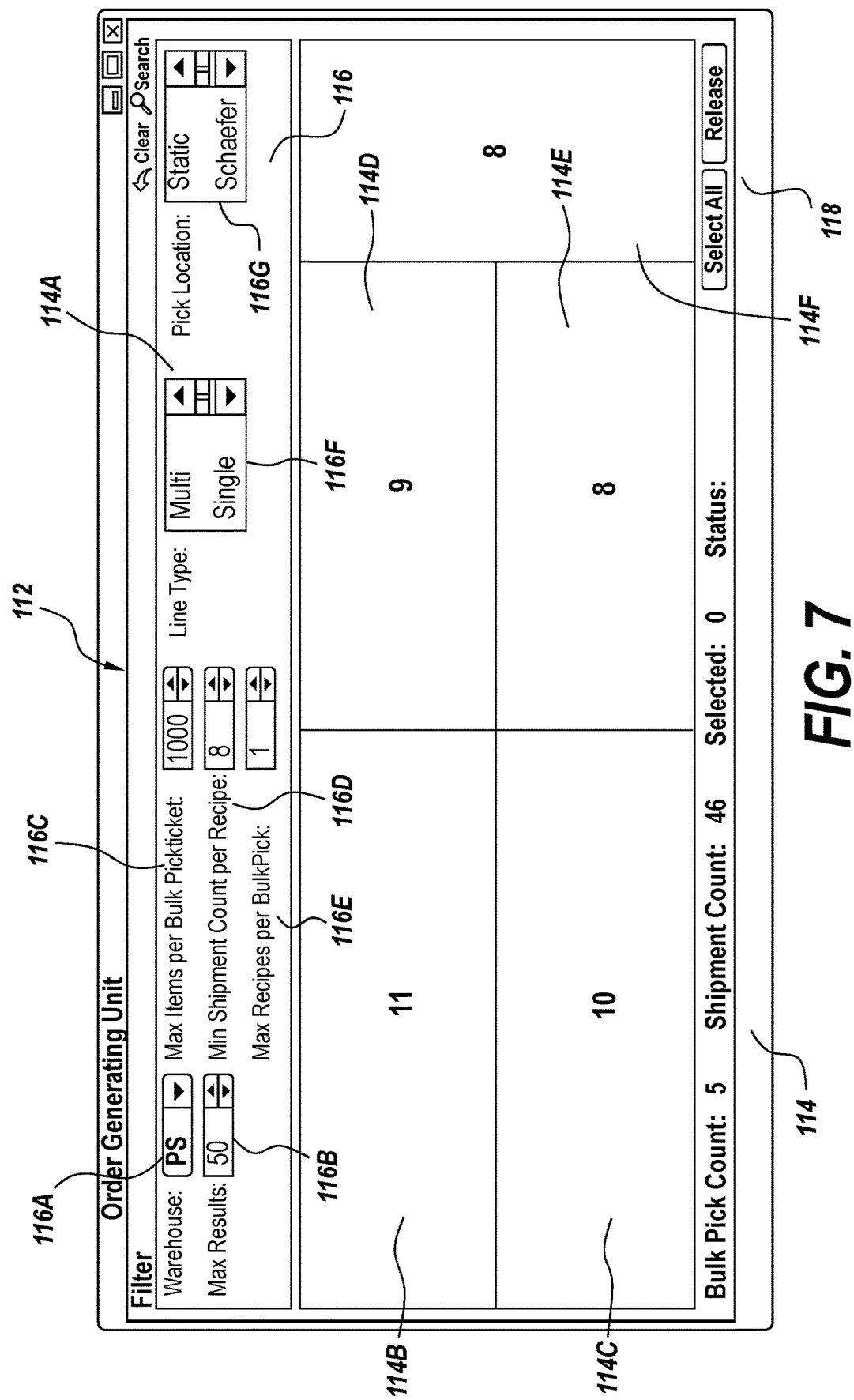
FIG. 7 is a tree map that operates as a visual representation of the relative amount of work that can potentially be fulfilled via a bulk pick order via a set of configurable operating parameters according to the teachings of the present invention.

The order generating unit 14 can generate a color coded or non-color coded tree map that can be displayed to the supervisors on a suitable display device as a visual representation of the relative amount of work that can potentially be fulfilled via a bulk pick order by the bulk pick order fulfillment unit 18 under a set of configurable operating parameters. An example of such a tree map is shown in FIG. 7. As shown, the order fulfilment system 10 can generate content that is displayed on a window or interface on a display device. The illustrated window 112 can include one or more panes 114 to display selected content associated with the customer orders and to enable or allow a user to customize via selectable parameters the metric associated with a bulk pick or wave. The panes 114 can include pane 114A that is positioned in an upper portion or region of the window 112 and which displays a set of user selectable parameters 116. The parameters 116 can include the selected warehouse 116A, the maximum number of results 116B to be considered by the bulk pick order fulfillment unit 18, the maximum and minimum number of different multi-item combinations (e.g., recipes) 116C to generate per bulk pick, the maximum recipes per bulk pick 116E, the line type 116F which includes whether a single item, multi-item, or both single item and multi-item orders should be included in the tree map and the pick location 116G (e.g., static (nonautomated) or automated fulfillment system). The order generating unit 14 can then generate a map of the bulk wave for visual display to the user. The flexibility of these parameters enables the supervisor to adapt the amount and types of work they have pending in the order collection unit 12 to the available pick agents and availability of other system equipment, including the automated fulfillment system 16. The foregoing features or parameters can be presented to the supervisor in any suitable format, and can preferably be displayed in a dashboard format via the pane elements 114. The order generating unit 14 can release order information to the bulk pick order fulfillment unit 18 to generate bulk picks and to the pick tour generating unit 20 to generate mobile pick tours for the pick agents. The order generating unit 14 via the window 112 can display the map that can be illustrated as a set of pane elements 114A-114F. Each of the respective panel elements 114A-114F contains the total number of customer orders that are included in the bulk pick. Larger numbers are contained in larger rectangles in the tree map and are ordered such that the larger total order counts are placed in a top-to-bottom left-to-right ordered by size. In addition to the size of the rectangle indicating the relative number of orders, the color of the rectangle may be used as a visual indicator of the estimated size or effort (e.g., red indicating a large number of orders, and blue representing a lower number of orders). This coloring technique offers a visual heat map of the orders that can be generated into bulk picks allowing a user to rapidly visually inspect the number of orders and estimate the effort involved to fulfill the respective bulk picks when released. The window 112 also displays on a bottom portion thereof parameter values selected by the user, including the bulk pick count, shipment count, as well as action buttons 118 that allow the user to select the illustrated parameters or to release the bulk wave to the system 10. As used herein, a pane element can be a user interface or portion thereof, such as a screen, a space, a surface, or the like.

The bulk pick order fulfillment unit 18 employs processing hardware for implementing heuristics and rule based schedules that determine the optimal way to group items in the customer orders into shipments. The logical parameters include consideration of the payment status of the customer or of the customer orders, destination addresses, and services such as sizing and appraisals that may have been applied to the items of the customer order. The bulk pick order fulfillment unit 18 also considers the shipping option selected by the customer and the guaranteed or estimated shipping dates that were communicated to the customer, as well as other factors, including grouping of items based on specific product brand, sales of items, and different sales channels.

Consolidating customer orders into shipments using the foregoing time-based process has multiple benefits and advantages. One advantage is that the process reduces the amount of shipment packaging materials needed, reduces the number of promotional inserts needed, and reduces the overall postage cost of shipping the packages. Additionally, customers may be incentivized to purchase additional items by reduced shipping and handling rates for additional items purchased within a selected time period, such as for example a twenty four hour time period.

Figure 2:
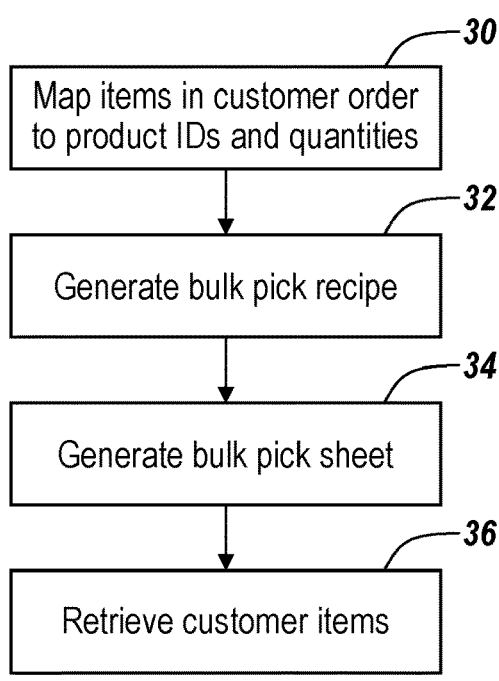
FIG. 2 is a schematic flowchart diagram illustrating the steps for generating a bulk pick recipe according to the teachings of the present invention.
Figure 3:
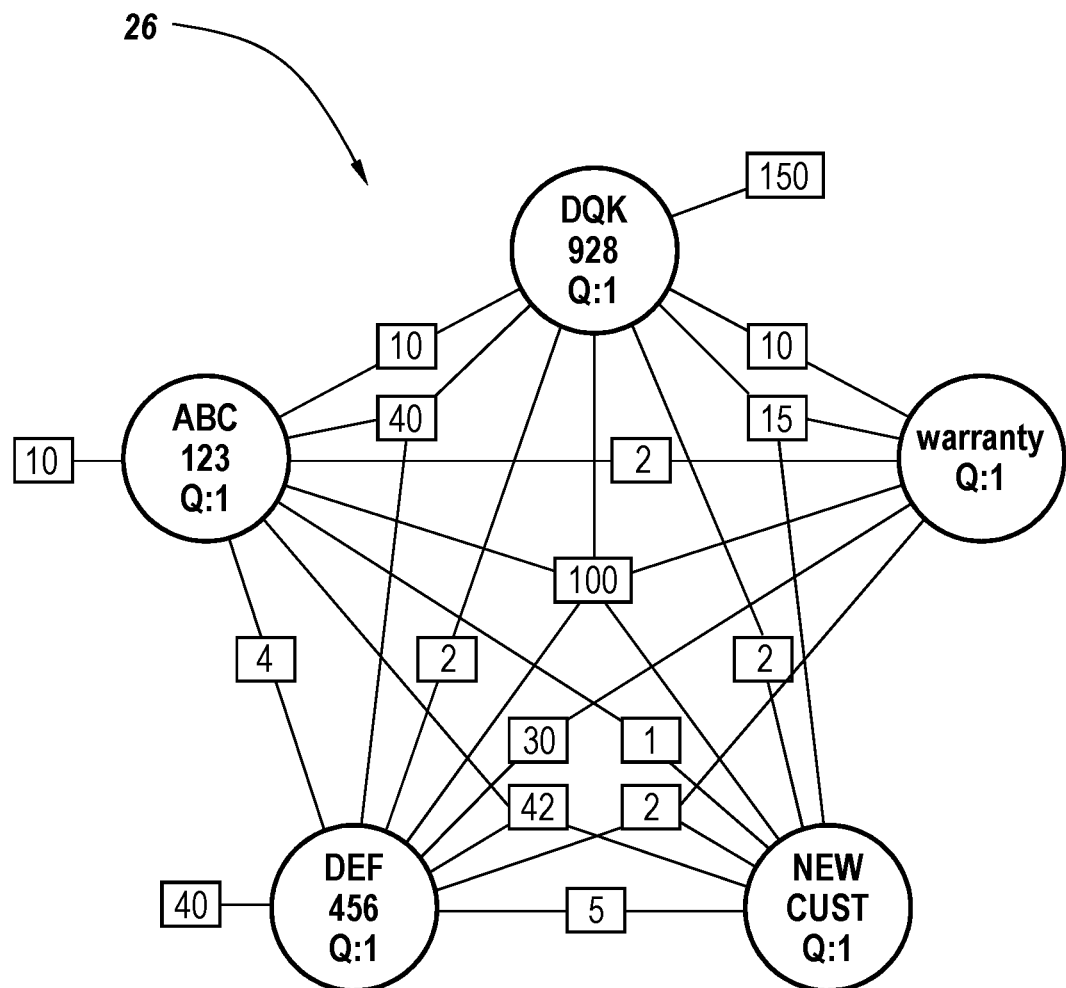
FIG. 3 is a connected tree map diagram for determining the relationship between various items in various customer orders according to the teachings of the present invention.

FIG. 2 is a schematic flow chart diagram that illustrates the process or method that the bulk pick order fulfillment unit 18 employs to generate one or more bulk picks or bulk pick recipes from the consolidated order fulfillment data received from the order generating unit 14. The bulk pick order fulfillment unit 18 includes processing hardware, such as a hardware processor or controller, that is configured to initially map items in the customer order to product identification (ID) data and selected quantities of product, step 30. For example, as shown in FIG. 3, the illustrated bulk pick order fulfillment unit 18 generates a connected graph 26 of groupings of customer orders and corresponding items, and then devolves the customer orders into constituent items and corresponding inserts such as informational, warranty, and marketing materials, and places them on the connected graph as nodes. As shown, and according to a simple example, the items that form part of this potential bulk group of customer orders include three different product items designated as ABC123, DEF456, and DQK928 that were purchased by customers and formed part of the customer order data. In addition to the customer items, the example assumes that the orders also include a new customer card designated as NEW CUST and a warranty card. The number of purchased items that overlap and require warranty and new customer cards are illustrated by the connecting lines with corresponding amounts or numbers. Specifically, the number of customers that purchased selected items and require a warranty or new customer card are shown in the intermediate number boxes. As shown, one hundred (100) customers purchased all three items and require a warranty card and a new customer card; one hundred fifty (150) customers only purchased the item DQK928; only forty (40) customers purchased item DEF456; forty (40) customers purchased all three items and are not receiving any inserts, and so forth. Other item amounts are also shown.

Figure 4:
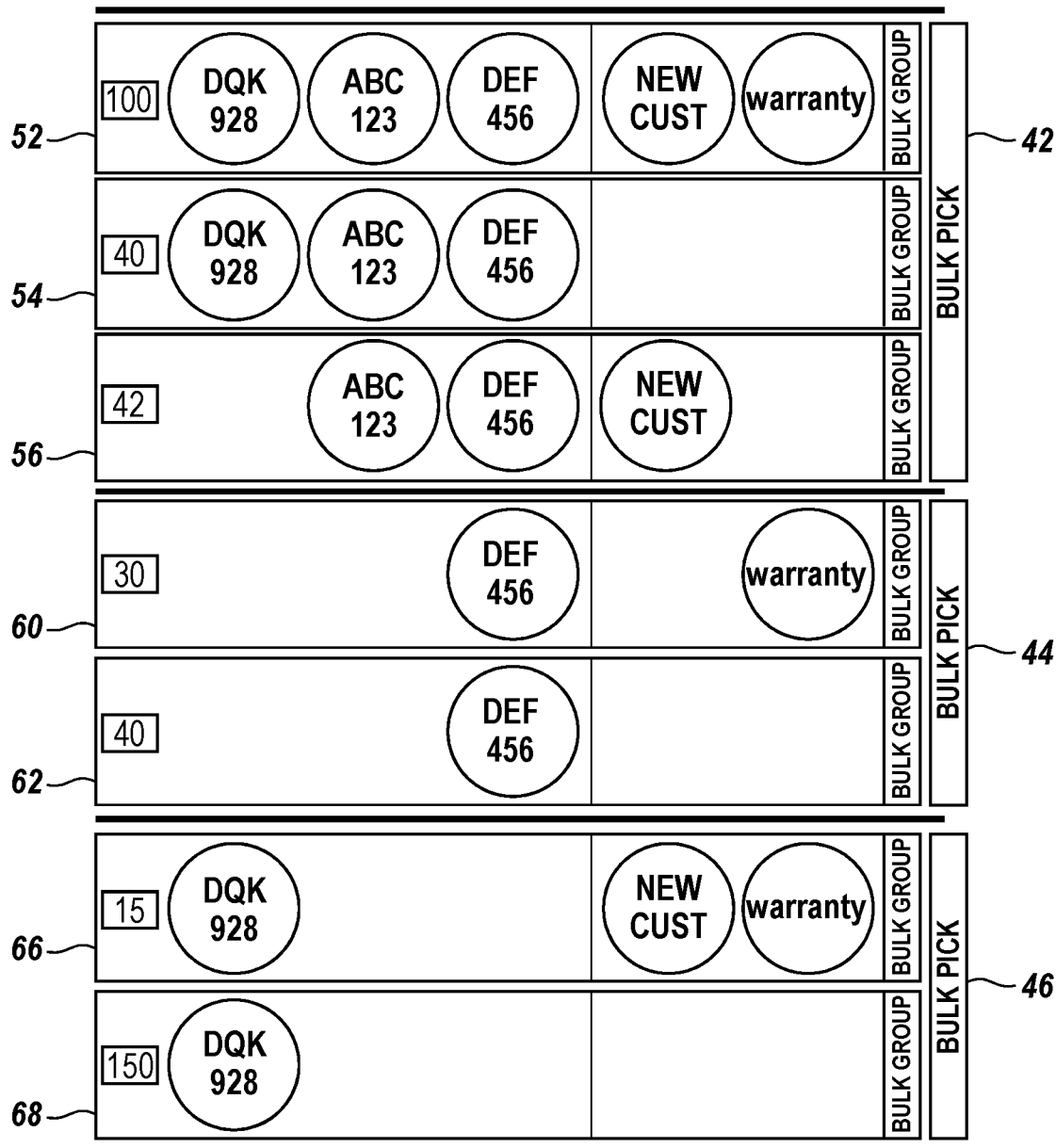
FIG. 4 is a depiction of the bulk picks and corresponding bulk pick recipes according to the teachings of the present invention.

The bulk pick order fulfillment unit 18 can also generate one or more bulk pick recipes from the data associated with the connected graph, step 32. As used herein, the term "recipe" or "bulk pick recipe" is intended to mean a collection of selected items from the customer orders and the additional items that are correlated or grouped together. As shown in FIG. 4, a user such as the supervisor can select various parameters or features 58 of the bulk pick in the bulk pick order fulfillment unit 18. For example, a user or the system 10 can define the maximum number of recipes per bulk pick, the maximum item count per bulk pick, and the minimum bulk group item count. Once the user has selected these parameters, the resulting calculated values for the bulk pick are presented including the total number of ingredients (i.e. items), the total number of recipes, and the total number of bulk picks that are generated. As shown, the bulk pick order fulfillment unit 18 generates and constructs bulk picks 42, 44, and 46, where each bulk pick comprises a selected number of bulk pick recipes or bulk groups. The bulk pick order fulfillment unit 18 can determine the bulk pick group or recipe sequence by determining the largest or smallest matching product or item count and then determining the largest or smallest number of inserts. The system can thus organize and aggregate the data in ascending or descending order relative to the number of items in the bulk pick. Those of ordinary skill in the art will readily recognize that the item data from the connected graph 26 can be organized in other ways as well. As illustrated, bulk pick 42 includes bulk pick recipes 52, 54 and 56; bulk pick 44 includes recipes 60 and 62; and bulk pick 46 includes recipes 66 and 68. Each of the above recipes includes one or more ingredients or items. For example, recipe 52 includes five ingredients, including items DQK928, ABC123, and DEF456, as well as the new customer insert NEW CUST and the warranty insert. Recipe 54 includes items DQK928, ABC123, and DEF456 with no additional inserts, and recipe 56 includes, for ingredients, items ABC123 and DEF456 and the new customer insert NEW CUST. Once the maximum number of recipes for each of the bulk picks is reached, the bulk pick order fulfillment unit 18 creates a further bulk pick. The bulk pick order fulfillment unit 18 can also generate less than the maximum number of bulk pick recipes, such as those associated with the bulk picks 44 and 46. The bulk pick order fulfillment unit 18 generates and organizes the bulk picks so that the most difficult recipes are collated first into the first bulk pick. For example, as shown in FIG. 4, the bulk pick 42 includes recipes 52, 54, 56 that are more complicated than the recipes in the other bulk picks 44 and 46.

When the bulk pick order fulfillment unit 18 generates one or more bulk pick recipes that include ingredients (or the recipe itself) outside of one or more of the predetermined parameters, the unit 18 does not generate a bulk pick employing these recipes. The bulk picks and corresponding bulk pick recipes can be utilized by the system 10, such as by the pick tour generating unit 20 or the automated fulfillment system 16 so that the ingredients within the recipe are selected either by pick agents via a mobile tour or by the automated system. Further, the bulk pick order fulfillment unit 18 partitions or separates the bulk picks from each other according to the bulk pick group count parameter and the maximum item count per bulk pick parameter.

Figure 5:
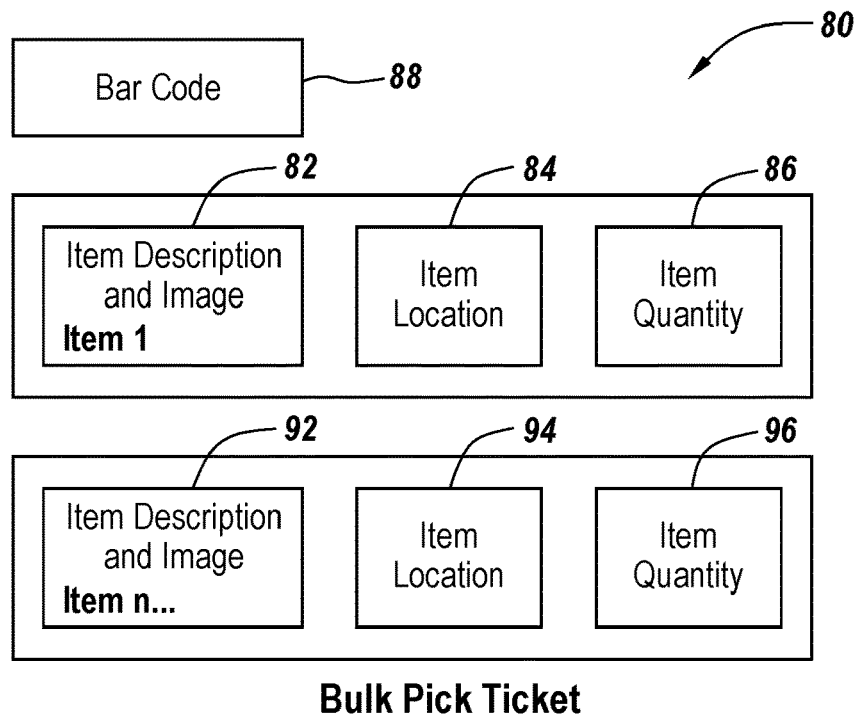
FIG. 5 is a schematic block diagram of a bulk pick ticket generated by the order fulfillment system of the present invention.

The bulk pick order fulfillment unit 18 then generates a bulk pick sheet or ticket that corresponds to each of the bulk picks 42, 44, 46, step 34. The bulk pick ticket is sent to either a mobile pick agent and/or to the automated fulfillment system 16 to retrieve the items, step 36. If the bulk pick ticket is sent to the automated system 16, processing hardware and corresponding software associated with the system 10 or the automated system 16 can perform the retrieval of the items based on the information contained within the bulk pick ticket. FIG. 5 is an example of a bulk pick ticket 80 generated by the bulk pick order fulfillment unit 18 according to the teachings of the present invention. The bulk pick ticket 80 can be printed by any suitable printing device associated with or coupled to the bulk pick order fulfillment unit 18 or the bulk pick ticket can be transmitted to other portions of the system 10 via processing hardware. The illustrated bulk pick ticket 80 can include any selected type and arrangement of information, and includes for example a description and image of one or more items, such as the illustrated Item 1 and Item n. The first listed item in the bulk pick ticket 80 is Item 1, and includes information such as the description and image of the item 82 to be picked from the warehouse, one or more locations of the item 84 in the warehouse, as well as the quantity of the item 86 to be picked. Similarly, Item n includes information such as the description and image of the item 92 to be picked from the warehouse, a location of the item 94 in the warehouse, as well as the quantity of the item 96 to be picked. The bulk pick order fulfillment unit 18 can print one or more of the bulk pick tickets 80 for use by the system and by, for example, a pick agent. A bar code 88 can also be associated with the bulk pick ticket 80 so that the pick agent and subsequent handlers of the items can determine the customer orders associated with the items via barcode scan.

The items identified by the bulk pick process of the bulk pick order fulfillment unit 18 and as set forth in the bulk pick ticket 80 can be picked according to the following process. One of ordinary skill in the art will readily recognize that the process can include additional steps or can omit one or more of the following steps without departing from the spirit and scope of the present invention.

Figure 6:
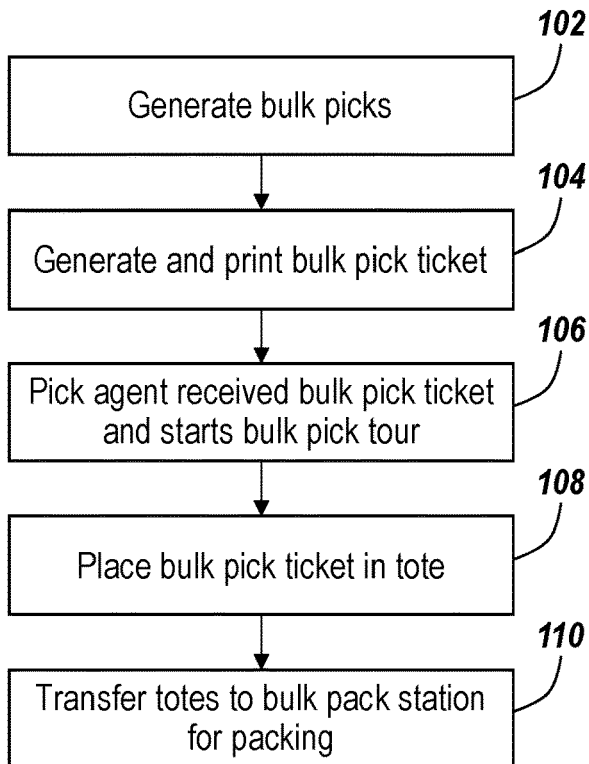
FIG. 6 is a schematic flow chart diagram illustrating the steps involved with generating a bulk pick ticket and associated bulk pick tour according to the teachings of the present invention.

As shown in FIGS. 1 and 6, the order fulfillment system 10 of the present invention collates and collects the customer order information with the order collection unit 12, and conveys this information to the order generating unit 14. The order generating unit 14 visually displays the order data through a display device to a warehouse supervisor, who sets or selects certain bulk wave parameters. For example, the system 10 can generate the tree map shown in FIG. 7 for use by the supervisor. The order generating unit 14 also receives other related information, such as additional customer information, order status information, and other system related information, from the database 24. The order generating unit 14 then transmits consolidated order fulfillment information to the bulk pick order fulfillment unit 18. The bulk pick order fulfillment unit 18 generates the bulk picks, step 102, as shown in FIG. 6. The bulk pick and related customer order and item information is sent to a print device to print the bulk pick ticket 80, step 104. The bulk pick ticket 80 is received by a pick agent in the warehouse who creates or employs a bulk pick cart for temporarily storing the items associated with the bulk pick. The pick agent then starts a bulk pick tour, step 106. The pick agent moves along a path in the warehouse that is optionally optimized by the system 10 to retrieve or pick the items at selected locations. The selected items are then placed in selected compartments within each tote that is stored on the cart, or kept separated in containers or bags. The bulk pick ticket is then associated with one or more of the totes, step 108. Specifically, the bulk pick ticket can be placed on one of the totes, typically the tote on top when stacked, or is affixed to the cart in cases of very large bulk picks. The cart and associated totes are then moved to a selected area in the warehouse, and the totes are moved from the cart to a temporary holding station, and are then transferred by any suitable mechanism, including a conveyor belt system, to a bulk packing station, step 110. A bulk pack agent associated with the bulk pack station then scans the barcode on the bulk pick ticket 80 to determine if the recipes of the bulk pick are complete. If not, then the agent keeps assembling customer orders according to the bulk pick recipe until the recipe is complete. If more than one recipe is included in the bulk pick, then the next unfinished recipe is loaded for continued processing. The items are then packed and shipped to the customer according to known techniques.

The bulk picking of items in customer orders by the bulk pick order fulfillment unit 18 offers additional benefits and advantages. For example, a bulk pick is more efficient than a shipment pick performed by pick agents in situations where there are many customers that ordered the same set of items. This is because the pick agent only needs to visit a location once per item, and can pick multiple ones of the same item at the same time. Although the pick agent can employ a mobile cart for picking multiple single item shipments, or multiple multi-item shipments on a cart while performing non-bulk picks, a barcode scan is required on each item and tote compartment to perform an association to ensure item movement tracking accuracy. The bulk pick process can handle much larger quantities or items per pick, and does not require a barcode scan.

By way of example, consider a situation where one hundred customers ordered the same item. A pick agent can be directed to pick one hundred of the same item from a stock location and then take the entire group to a bulk processing station where the weight of the item and inserts is acquired once, customer invoices are printed, and then the agent assembles the individual shipments like stuffing envelopes. In addition to single item bulk picks, the system 10 supports multi-item picks and also takes into account any promotional, product oriented, or customer oriented inserts such that each of the recipes is unique. An example of a multi-item bulk pick is an ensemble scenario where one hundred customers ordered a ring, and fifty of those customers also ordered the matching bracelet, and another twenty five customers ordered just the bracelet. This would yield a bulk pick with two items: one hundred rings, and seventy five bracelets. This example bulk pick is then assembled into separate customer orders from a total of three recipes: fifty of just the ring, fifty of the ring and bracelet, and twenty-five of just the bracelet. In addition, customer oriented inserts yield more variations of these recipes, but ultimately there is a single pick of just two items that was able to fulfill all of these permutations.

The ability to pick single item shipments and multi-line shipments in parallel via bulk pick reduces the amount of distance and time that it takes to pick the customer shipments. An additional benefit of using the bulk pick process and system is being able to utilize less sophisticated machinery to perform the final packaging step of processing the shipment.

The illustrated pick tour generating unit 20 in FIGS. 1 and 8 is described in further detail herein, with reference for example to FIGS. 1-7 and with further reference to FIGS. 8-13. The order generating unit 14 of the order fulfillment system 10 interfaces or communicates with the pick tour generating unit 20, which receives the order fulfillment instructions 26 from the order generating unit 14. The pick tour generating unit 20 generates pick instructions for a single item or a multi-item order. The pick instructions can be forwarded to the automated product picking system 16 and/or to a pick tour mobile operator for performing a pick tour.

As shown in FIGS. 1 and 8, the order generating unit 14 communicates with the pick tour generating unit 20 via output data signal 28. The order generating unit 14 organizes and collates customer orders into a set of shipments. The pick tour generating unit 20 forms part of the illustrated pick tour generating sub-system 29. A shipment consists of a unique shipment identifier and a set of location and quantity pairs. Further, a graph, map or other representation of the warehouse layout or footprint ("map") can be created and stored, such as for example in the warehouse map unit 120. The warehouse map can include indicia indicative of multiple rows of shelving, as well as indicia associated with the bays or vertical locations located along the rows of shelving. Other types of marking or location related information can also be used. The warehouse map unit 120 can be any selected storage element that is configured for storing warehouse map data. The warehouse map unit 120 can be a stand-alone storage element or can be integrated with one or more other system units, such as for example with the database 24 or the pick tour generating unit 20. For the sake of simplicity, the warehouse map unit 120 is illustrated as a separate unit. The warehouse map unit 120 can also store the locations in the warehouse where various items are stored, as well as the selected vertical bay at the warehouse location. The items correspond to one or more items that form part of the customer order.

The order fulfillment system 10 of the present invention employs a cart building unit 128 that stores, transmits and receives data associated with a mobile cart, and specifically includes a container or tote data for use by the pick agent as how to best arrange totes or containers on a mobile cart employed by the pick agent. The tote data can correspond to data associated with specific totes as well as to sub-compartments within the totes. The totes and associated sub-compartments are arranged and scheduled consistent with the pick orders sent to the pick agent. Similar to the warehouse map unit 120 and the graph generating unit 124, the cart building unit 128 can be a separate element or can form part of the pick tour generating unit 20. The totes on the mobile cart can be uniquely identified by identification (ID) information, which can include any type of suitable data, including for example alphanumeric data. The ID information can be encoded in a barcode that can be placed on the front or back of the tote that is scanned while on a cart or on a suitable transport system (e.g., a conveyor belt) within the warehouse. The tote can include one or more sub-compartments, such as for example four sub-compartments or quadrants. In addition to the barcodes on the exterior of the tote, each sub-compartment of the tote can also include unique identification information, such as a barcode. The ID information associated with each sub-compartment is used and scanned by the pick agent. The sub-compartments can house one or more selected items associated with a shipment. The ID information can be exchanged with the cart building unit 128 and/or with the pick tour generating unit 20.

The pick tour generating unit 20 can for example perform a mapping between the customer orders or shipments and warehouse locations in the form of a map, such as a shipment-bay graph. This mapping or graphing can be performed by the graph generating unit 124. The graph generating unit 124 can be a separate element or can form part of the pick tour generating unit 20. The graphing can be performed in a manner so as to optimize the time and distance that a pick agent needs to travel when picking or selecting certain items. The items correspond to one or more portions of one or more customer orders. The graphing can also be optimized so as to avoid potential collisions between pick agents and to consider the location of any selected transport system, such as conveyor belts, so as to ensure that the pick agent has relatively easy and speedy access to the transport system. The graph generating unit 124 also generates the graph employing shipments or customer orders that include more than one item located at more than one location.

The illustrated graph generating unit 124 can employ a value sorted tree map technique when generating the map or graph. An example of the value sorted tree map 130 is shown for example in FIGS. 9A and 9B. Specifically, FIG. 9B illustrates that the value sorted tree map 130 is an associative array data type that enables high-speed graph modification while concomitantly maintaining value sort order. The associative array data type, also known as a map, comprises a collection of keys, including (key, value) pairs, such that a value can be quickly retrieved by the key, without necessitating an ordering of the set of values that the keys are mapped to. When employing the value ordered tree map 130, the ordering of the values are retained during access, insertions, and deletions, thus allowing for optimization of graph traversal because the values do not need to be re-sorted before use or after modification.

An example of the value sorted tree map 130 compared to traditional mapping techniques is shown in FIGS. 9A and 9B. FIG. 9A shows a map 132 with a list of items having associated identifications, such as L101, L102, L103, and L104. The items are mapped to graph nodes A, B, C, and D, which can according to one practice correspond to warehouse locations. The traditional map implementation does not guarantee the order in which the values associated with the items illustrated in the map 132 are retrieved by the pick agent. Before deciding which graph node is the next in the sequence to be processed, the map values have to be sorted again. For example, the values for the A node are L102, L101, and L103, which needs to be sorted into L101, L102 and L103 before selecting the next node in the sequence. The sorting functionality is also required when processing the other map nodes B, C, and D. The continuous need for re-sorting introduces significant overhead when processing large graphs in both computation times for the sort, as well as the physical computing resources required, such as processing capabilities and memory.

The value sorted tree map 130 of the present invention ensures that the values or node links remain in a sorted order during access, insertion, and deletion which removes the need to sort all of the value nodes when deciding which node to process next in the graph. For example, as shown in FIG. 9B, the items are presorted and listed as L101, L102, L103, and L104, and then mapped to the graph nodes A, B, C and D. When the value L101 is removed for example from the value sorted map for node A, then the new first value becomes L102, without the need to re-sort the values of the map. The value sorted map technique of the present invention is highly beneficial for graph processing algorithms that alter the graph by removing nodes during graph traversal. As such, the present sorting technique significantly reduces the amount of processing overhead and memory needed while processing the graph. By maintaining the high speed key to value lookup characteristics of a map, and automatically implementing and maintaining sort order on modification, the value sorted tree map provides a very efficient technique for optimizing graph processing. Further, shipments of customer orders that have more than one location pick are placed in the graph. The orders that have a single item or location can be handled separately.

When creating the value sorted tree map 130, the incoming customer orders or shipments are analyzed by the order generating unit 14 to determine if the order is to be handled by the automated shipment system 16, by the pick agent as part of a pick tour plan or a pick tour, or a combination of both. When the system 10 with the assistance of the supervisor determines that the order or part of the order is to be handled by the pick agent, the pick tour generating unit 20 determines if the order includes items located at multiple different locations in the warehouse. The system can easily determine the warehouse bay from the warehouse location. If the bay node exists, then the quantity of the pick from the bay can be incremented. If the shipment node does not already exist in the map, the pick tour generating unit 20 creates a new graph or bay node in the map. The system then adds a link from the shipment node to the bay node in the graph and the pick tour generating unit 20 tracks the quantity of the shipment in the bay/node structure. The resultant graph or map is then value sorted by the first bay location and/or bay count, and then the subsequent bay location. The map is then sorted by location. The graph is processed in such a manner that optimizes the assignment of orders into an N number of the sub-compartments or the compartments of the mobile cart. Further, the system 10, such as through the pick tour generating unit 20 and/or the graph generating unit 124, analyzes the customer order and shipment information and inserts the shipment data into the graph and creates a new graph node for the shipment if the bay node does not exist. For each item of the shipment determine a corresponding warehouse location, and then determine a warehouse bay from the location. The system then adds a link in the graph between the bay node and the shipment node. The shipment graph is then value sorted by the first bay location, bay count, and then subsequent bay location.

The pick tour generating unit 20 then constructs a pick tour plan or a pick tour having pick instructions associated therewith. The pick tour plan and the pick tour essentially provide a schedule or list of tasks for the pick agent to follow. The pick tour plan is constructed or generated so as to optimize the path distance through the warehouse as well as the number of pick tasks that a pick agent can execute when eventually performing the pick tour. Factors that the order fulfillment system 10 considers when optimizing or constructing the pick tour plan can include but are not limited to avoiding impediments or obstacles within the warehouse, such as for example walls and machinery, preferred human walking paths, opportunistic drop-off points like the central conveyor belt and location stock density as well as travel distance and quantities of products picked. Permissions required of the pick agent are also considered as picking expensive items, oversized items, or fragile items may require different levels of authorization or skill sets to perform. For example, a new pick agent may not have permission to execute a tour that contains important or expensive items.

Further, the cart building unit 128 employs the pick tour plan to help construct the pick cart by determining the number of totes and sub-compartments, and associating therewith the appropriate identification information. The pick tour plans are preferably constructed or generated so as to include trips by the pick agents to generally the same number of bays as well as the same number of picks or items, while concomitantly minimizing the overall or total walking distance by the pick agent. The pick plans are constructed by mapping the shipments or customer orders collected by the order generating unit 14 with the warehouse configuration data stored in the warehouse map unit 120 by the graph generating unit 124. The shipments that include more than one location pick are placed in the graph. The shipments that are directed to a single piece or warehouse location can be later added to the below pick tour. The pick plan includes a list or set of pick tasks that are segmented or partitioned into selected warehouse locations, thus creating different pick tasks for each warehouse zone.

Figure 12:
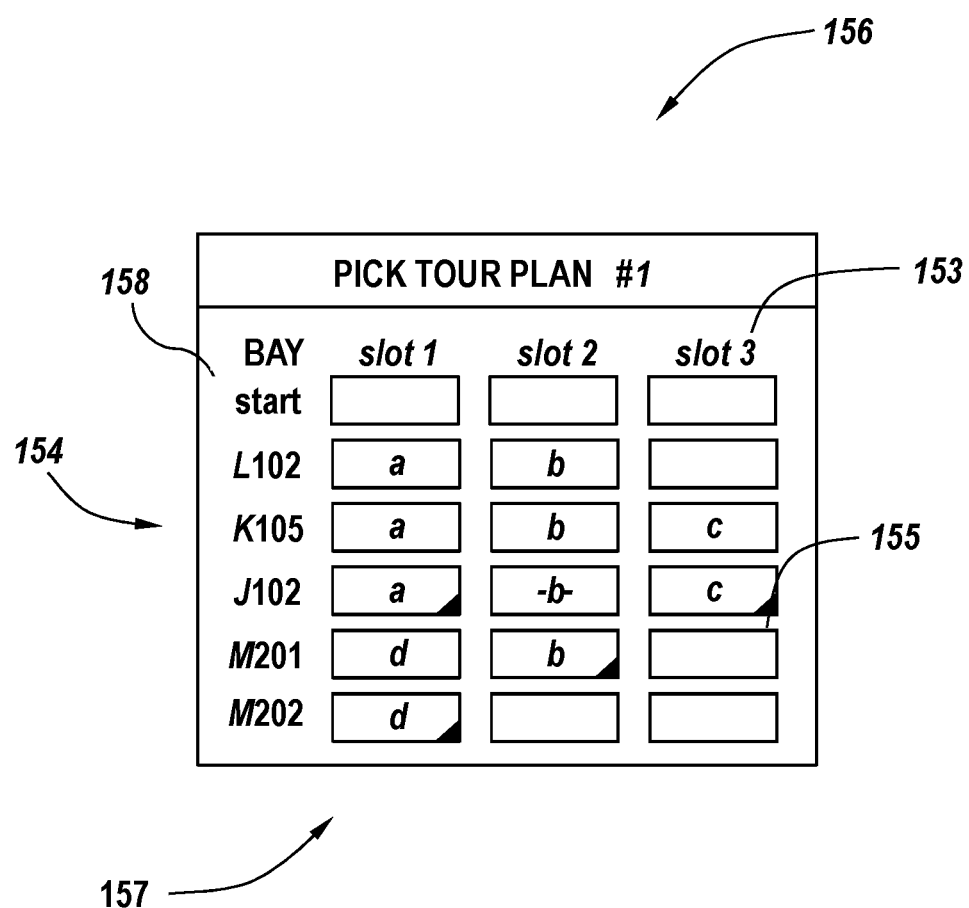
FIG. 12 is a schematic representation of a pick tour plan generated by the pick tour generating unit of the order fulfillment system of the present invention.

As shown in FIG. 12, a pick tour plan 156 can be created by the pick tour generating unit 20 and includes the illustrated pick instructions 157. According to one practice, the pick tour plan 156 can be optionally employed by the pick agent to retrieve or pick the items set forth in the pick instructions. Alternatively, the pick tour plan 156 can be converted into the pick tour 174 for use by the pick agent. By way of illustrative example, the illustrated pick tour plan 156 has been generated by the pick tour generating unit 20 and includes pick instructions 157 directed to four different customer shipments, which are labeled as 'a', 'b', 'c' and 'd'. By way of illustration, an exemplary mobile cart can be configured to use only three reusable slots 153 of the various slots on the cart. The slots 153 can be designated as slot1, slot2, and slot3, and form part of the pick instructions 157. When a customer shipment has been fully assembled, as depicted by suitable completion indicia, such as darkened triangles 155 in the bottom corner of the pick tour plan 156, the customer shipment is placed in a bag by the pick agent and labeled with a barcode so that the same slot may then be used to assemble a different customer shipment. In the example configuration of FIG. 12, the initial state of the pick tour plan is the start state 158 where each of the three slots 153 on the mobile cart is indicated as being empty. The warehouse map stored in the warehouse map unit 120 can include a number of bay locations 154 in the map. The pick tour plan 156 essentially sets forth a series of bay locations in the warehouse that the pick agent is instructed to visit to retrieve selected items located at the bay locations and that correspond to various customer orders. The bay locations 154 can include for example a first bay location in the warehouse that forms part of the pick tour plan 156, which can have any suitable designation, such as for example L102, as illustrated. As such, the pick agent is instructed by a mobile device user interface to pick a selected item for customer shipment 'a' into slot1 and the same item into slot2 for shipment 'b'. No pick was planned for slot3 at bay location L102, thus slot3 remains empty. The pick agent is then directed by the mobile device user interface to walk to the next bay location K105. Additional items are picked from this location for shipments 'a' and 'b', and which are placed in slot1 and slot2, respectively, and customer shipment 'c' is started by placing the item in the formerly empty slot3. The pick agent is then directed by the mobile device user interface to walk to the next bay location J102. Items are picked for shipment 'a' in slot1 and shipment 'c' in slot3, however shipment 'b' does not have any picks at location J102. However, the previously picked items continue to occupy slot2 because not all items for customer shipment 'b' have been picked. The customer shipments "a" and "c" are completed, as indicated by the completion indicia 155, and hence these items are bagged by the pick agent and labeled with the shipment number and then placed in a bin of completed shipments on the cart or directly on conveyance equipment such as a central conveyor belt destined for the packaging operation. Because customer shipments 'a' and 'c' are now complete, the respective slots slot1 and slot3 are now eligible to be used to assemble a different shipment. The pick agent is then directed by the mobile device user interface to walk to the next bay location M201. The pick agent is directed to pick items for customer shipment 'd', which is placed in slot1, as well as for customer shipment 'b', which is in slot2. The last item for customer shipment b' is picked, as indicated by the completion indicia 155. Slot3 remains empty because shipment 'c' has already been completed and taken out of the slot on the previous bay visit. The pick agent is then directed by the mobile device user interface to walk to the last bay location M202, where the agent picks the last item for shipment 'd' from this location and the pick tour plan is complete with all four shipments 'a', b', 'c', and 'd' having been picked and assembled on the mobile cart and now destined for the packing operation.

When compartmentalized totes on the mobile cart are used, the slots 153 represent sub-compartments of the totes and are typically not re-used because the tote itself is used as the container of the product instead of a bag. Once all picks for all sub-compartments of the tote have been completed, the tote is then transported by automated conveyance or by moving the mobile cart to a destination for unloading the totes for further processing.

Figure 13:
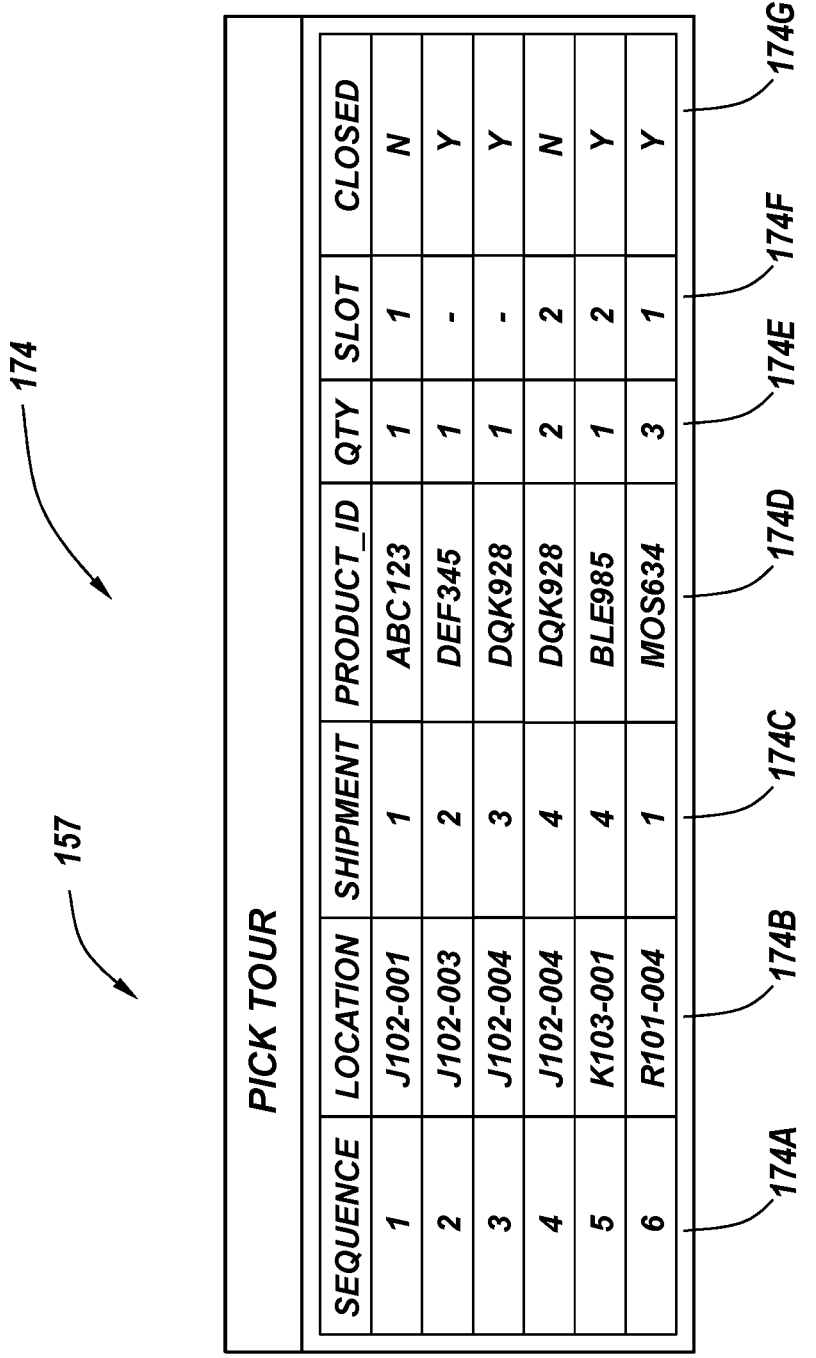
FIG. 13 is a schematic representation of a pick tour generated from a pick your plan by the pick tour generating unit according to the teachings of the present invention.

As shown in FIGS. 8 and 13, the pick tour generating unit 20 can preferably convert the pick tour plan 156 into the pick tour 174 having pick instructions associated therewith that are conveyed to the mobile device of the pick agent. As such, the pick tour plan 156 can be directly converted to the pick tour 174 prior to be being sent to the pick agent. The pick tour 174 can be, if desired, tours that are confined to selected zones or regions of the warehouse. As such, the location of the pick agent is considered when assigning a pick tour to a selected pick agent. The pick tour 174 includes pick instructions that are, in essence, an ordered list of tasks to perform, which includes the location, quantity, and specific items to pick as well as the mobile cart slot number to place the picked items into for subsequent shipment. The pick tour instructions leverage the similarity in customer orders and item locations within the warehouse so as to minimize the amount of time it takes to pick the one or more items that comprise the customer order. The pick tour includes a path that is optimized for time and distance for the pick agent. The path can have any selected configuration, and is typically a serpentine path. The mobile handheld device guides the pick agent to the selected location of the item in the warehouse and assists the pick agent in selecting the correct item. The handheld device also serves to allow the order fulfillment system 10 to track and verify the location of the pick agent, and to perform product and location verification in real time. The interface on the handheld device presents a visual interface that guides the pick agent through a pick tour walking path in the warehouse while concomitantly assembling multiple customer shipments on a mobile cart in parallel. As noted above, the mobile cart has a series of totes, and each tote can have one or more sub-compartments. The pick tour generating unit 20 optimizes the use of the totes and associated sub-compartments to sequence the assembly of multiple multi-line orders. The pick tour generally is confined to a selected duration so that multiple sequential pick tours can be performed by a pick agent. The duration of the pick tours can be between about 30 minutes and about 90 minutes, and preferably are about 45 minutes.

FIG. 13 shows for the purposes of simplicity and illustration an exemplary pick tour 174 that was generated from the pick tour plan 156. The pick tour 174 is similar to the pick tour plan 156 with additional detailed information where specific item locations, product IDs, and quantities are specified. Unlike the pick tour plan which focused on creating multiple optimal plans, the pick tour 174 focuses on having all of the information necessary to execute the pick or retrieval of the product by the pick agent. The sequence 174A is the order in which each of the pick tasks should be performed. The location 174B is the exact bin number at the bay location and also the bar-coded value that is placed on the bin. The shipment information 174C is the unique shipment ID that represents a customer order or grouping of customer orders for the same shipping destination address. The product ID 174D and quantity (QTY) 174E of the product to be picked from the location 174B is used to verify that the correct product and number of products is being picked. The slot information 174F is the destination of the picked item on the mobile pick cart which may be a re-usable bin or the sub-compartment of a tote. The closed flag or indicator 174G indicates if all of the items for the shipment have been picked upon the completion of the pick task. In the exemplary pick tour 174, shipments 2 and 3 174C correspond to piece picks where a customer only ordered a single product and only one quantity of that product, thus they do not need to be assembled with other products and are not placed in a slot, but instead are directly placed in a bag with an affixed printed adhesive barcode to identify the shipment in the bag. Once the pick agent has completed all of the pick tasks in a pick tour 174, the pick tour is complete and the pick agent may request a new pick tour. The pick tour assignment is based on the location of the pick agent in the warehouse relative to the first picking location for available pick tours. In some cases, the product stock may be segregated where special permissions may be required, such as for example when picking high end, fragile, oversized, or otherwise categorized products or items. The identity of the pick agent, the location of the pick agent, the permissions of the agent, and the priority of the pick tour are factors that the pick tour assignment algorithm uses in assigning pick tours to pick agents.

Once the pick tour plan 156 is generated and transmitted to the mobile device of the pick agent, the pick tour 174 can be started by the pick agent. According to the present invention, the pick tour 174 includes shipments or orders that correspond to items at multiple locations in the warehouse. The pick tour generating unit 20 can add a task to an existing pick tour that corresponds to an item located in a convenient or "opportunistic" location along the existing predefined pick tour path of the pick agent. The pick tour generating unit 20 can sort the additional individual piece pick tasks by location and then compares the piece pick tasks to the current pick tours or the pick tours as of yet to be assigned. The additional piece pick task typically includes one or more items disposed at a single location that is opportunistically located along the walking path of existing pick tour. The opportunistic piece pick task added to a pre-existing pick tour is a pick task that meets selected heuristic calculations regarding the closeness of the location of the item to the pick agent, the remaining pick cart capacity, the additional time added to the existing pick tour, and overall collision or contention reduction with other piece pick tours. Other factors can include whether the pick agent has already visited the warehouse location as part of the current pick tour, and whether the item location is along or sufficiently near the path of the current pick tour. The closeness of the piece pick location can be calculated in terms of time and/or distance to the current pick agent and current pick tour path, and the pick tour generating unit 20 can define an overall maximum distance or time to be added to the current pick tour in order to add one or more selected piece pick tasks to the tour. Thus, the pick tour generating unit 20 contemplates adding one or more additional piece pick tasks to the tour provided that the maximum or overall distance and time added to the pick tour is at or below the maximum amounts.

Figure 10:
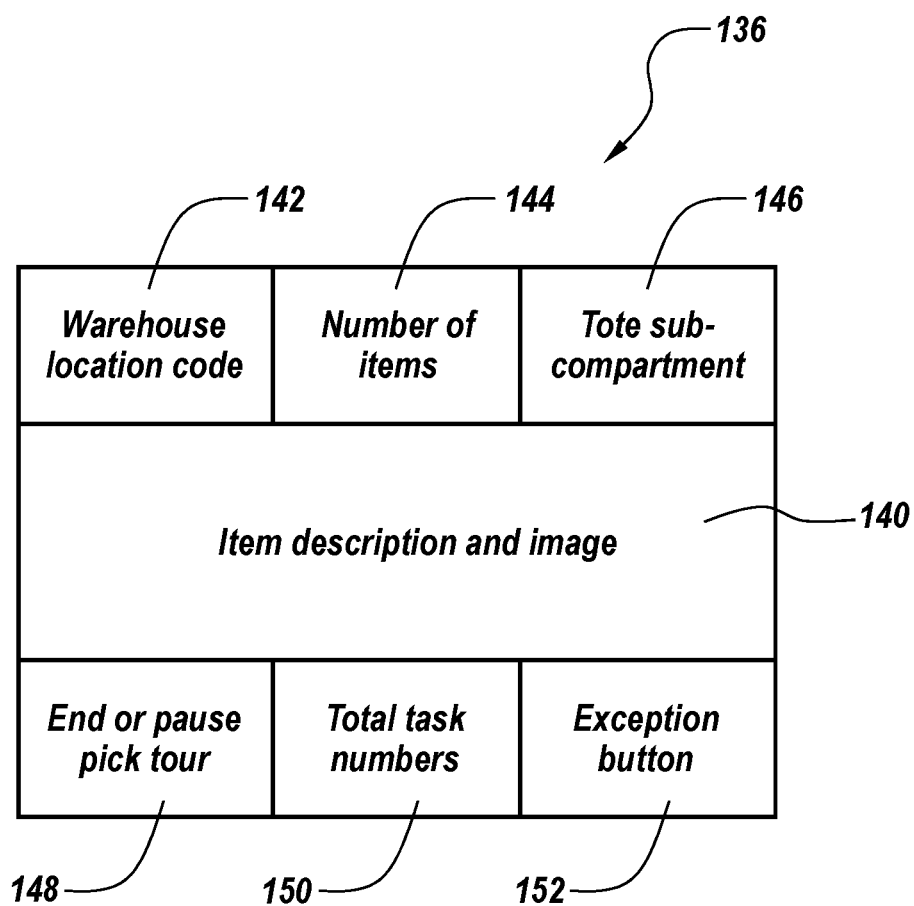
FIG. 10 is a schematic representation of the display of a handheld device employed by the pick agents during a pick tour according to the teachings of the present invention.

FIG. 10 illustrates an exemplary interface or display 136 of the mobile handheld device employed by the pick agent. The device has associated therewith suitable hardware, such as a scanner, processing hardware, memory and the like (not shown). The device has a display 136 that can be configured in any selected manner. As shown, the display 136 has a series of dedicated regions or areas that display selected types of information. For example, the display has a top area or region that has sub-regions 142, 144, 146, a central area or region 140, and a bottom area or region that has sub-regions 148, 150, and 152. The top sub-region 142 can set forth the warehouse location and bay of the item to be retrieved. The warehouse location and bay can have identification information associated therewith, such as a barcode. The handheld device can scan the barcode of the location, and if the location matches the location displayed in sub-region 142, a visual or audible alert can be provided. In the event that the location does not match, an alternate visual or audible alert can be provided that indicates an error. For example, the sub-region can change color to visually indicate that a match exists. Conversely, the handheld device can produce an audible sound or generate a tactile sensation. The handheld device can then be used to scan a barcode attached to the item to verify that the correct item is being picked. The item to be picked can be displayed in the central region 140 along, if desired, a barcode number. The pick agent can thus perform a secondary visual check to ensure that the picked item visually matches the item displayed in the region 140. This provides redundancy in the system to ensure that the pick agent is selecting or picking the correct item and can identify situations where an item may have the incorrect tag or barcode. The pick agent can touch the region 140 to display more detailed information about the picked product, such as product SKU, product description, and other associated information that could be used to identify the item in the case that a product image is not available or more information about the product is needed. Next, the pick agent scans the target tote compartment where the product is to be placed, as shown in sub-compartment 146. The pick agent can also visually determine and confirm the number of items to be picked from the warehouse compartment, as indicated in sub-region 144. Any one of or all of the sub-regions 142, 144, 146 can change color to visually indicate a match between the ordered item and the product retrieved from the warehouse bay. When completed, the pick agent travels to the next warehouse location provided in the pick tour.

The display 136 also includes a bottom region that includes a sub-region 148 that allows the pick agent to pause or cancel the pick tour, a display sub-region showing the number of tasks completed and the number of total tasks (sub-region 150), as well as a display sub-region that allows exception information to be entered or can be used as a visual indicator of the network connection status (sub-region 152).

Once the last item for a shipment is picked and placed in a slot or sub-compartment of the tote, the pick agent is instructed that the sub-compartment is now closed and the shipment has been fully assembled. This information can be conveyed to the pick agent through the mobile handheld device. The completed totes may then be taken off of the mobile cart and placed on a central conveyor belt or otherwise delivered to the next step in the packing and shipping process. Alternatively, the contents of the sub-compartment are then placed in shipping bags by the pick agent, and then the bags and/or the tote(s) are then placed on a central conveyor belt and are sent to the packing and shipping subsystem 22.

Figure 11:
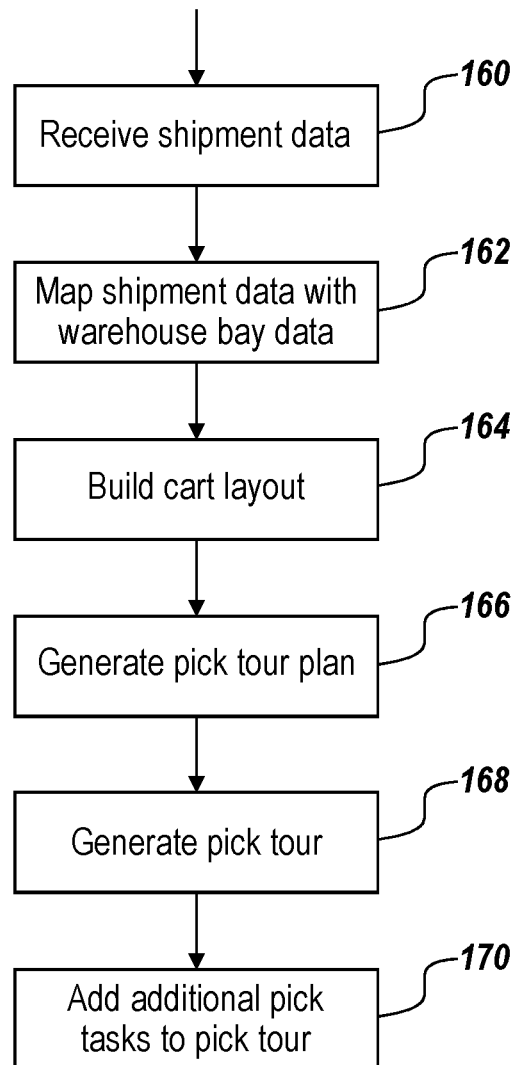
FIG. 11 is a schematic flow chart diagram illustrating the steps involved with generating a pick tour plan and associated pick tour according to the teachings of the present invention.

FIG. 11 is a flowchart depiction of the pick tour generation process performed by the order fulfillment system 10 according to the teachings of the present invention. The system 10 receives customer order information from the customer and the order information is collated by the order collection unit 12. The order collection unit 12 then conveys this information to the order generation unit 14. The customer order information is combined with the customer shipment or address information either provided by the client for first time customers or the information is retrieved from the database 24, step 160. The graph generating unit 124 maps the shipment data with the warehouse map data stored in the warehouse map unit 120 to generate a shipment-bay graph or map, step 162. The map is value sorted to create a value sorted tree map. The cart building unit 128 then provides the pick tour generating unit 20 with cart specific information or data, including identification information of the containers or totes on the mobile cart, as well as identification information for any sub-compartments within each container or tote, step 164.

Once this information is determined, the pick tour generator 20 initially generates a pick tour plan 156, step 166. The pick tour plan 156 is constructed or generated so as to optimize the path distance through the warehouse as well as the number of pick tasks that a pick agent can execute when eventually performing the pick tour. The pick tour plan 156 includes location information of the customer items, including warehouse location and corresponding bay, as well as container and sub-compartment information of the mobile cart. The pick tour plan is then converted into a pick tour 174 by the pick tour generator 20, step 168. The pick tour 174 can include any information required by the pick our agent to conduct the pick tour, including the location information of the items to be picked, identification information of the items, and the quantity of the items to be picked. During the pick tour, the pick tour generator 20 can add a pick task to the current pick tour of the agent if the agent is located in a selected proximity to the item, step 170. This opportunistic piece pick enables orders to be processed by the order fulfillment system 10 as expeditiously as possible.

As shown in FIGS. 14-17, the automated fulfillment system or sub-system 16 of the present invention can be any commercially available product picking or fulfillment system, such as those manufactured by SSI Schaefer of Germany. The automated fulfillment system 16 can include a series of vertically and horizontally extending carousels 220, each of which can include a plurality of spatially separated shelves or racks (not shown). The totes or tubs 222 from the system 10 can be conveyed to the carousels 220 via a transport system, such as the illustrated conveyor system 226. The conveyor system 226 can include a series of mechanical connections that allow one or more tubs 222 to travel both horizontally between rows of shelves as well as vertically among the shelves. The carousels 220 thus function automated racks of tubs that can retrieve a specific storage and deliver it to the conveyor system 226. The conveyor system can be coupled to the shelves so that the tubs containing items can be transported within as well as to and from the automated fulfillment system. Mechanical arms (not shown) place items from the shelves into the tubs 222 and when a customer order is complete, the tubs 222 are conveyed via the conveyor system 226 to a pick station 230. At the pick station 230, the items of the customer order are removed from the tubs 222 and then placed in pick totes 228. The tubs 22s are then returned to the carousels 220. The system can be controlled by known hardware and software, and employs a control station to control the movement of the bins throughout. The control station can form part of the bulk pick order fulfillment unit 18 and/or the pick tour generating unit 20, or can be a separate control station that communicates with these as well as other units.

Figure 14:
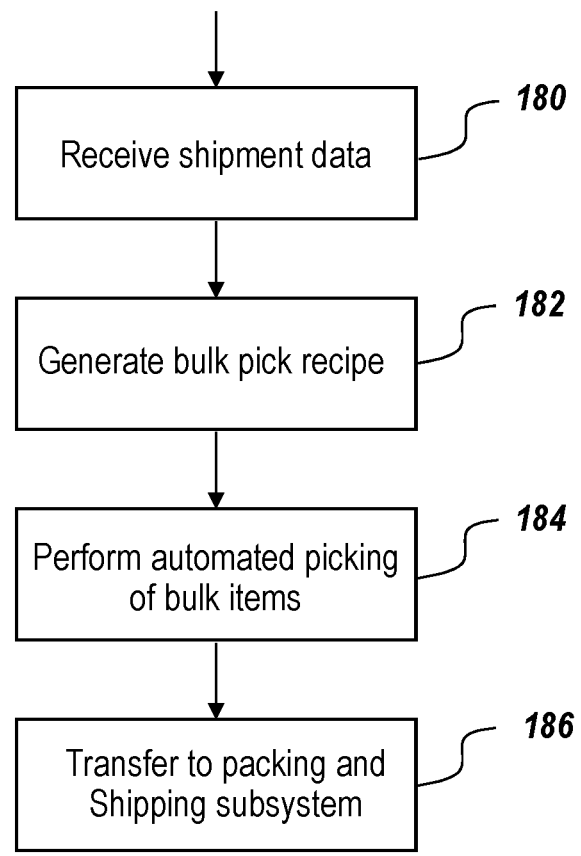
FIG. 14 is a schematic flow chart diagram illustrating the steps involved with picking items from a customer order via a bulk pick recipe by employing the automated fulfillment system according to the teachings of the present invention.

Similar to the above in connection with the bulk pick order fulfillment unit 18, and as shown in FIG. 14, the system 10 receives shipment and item data, step 180, from the customer orders. The customer order collection unit 12 generates customer and order information that is transmitted and received by the order generating unit 14. The order collection unit 12 consolidates the incoming customer orders and organizes and consolidates selected order and customer information from the customer orders. The order generating unit 14 is configured for controlling and managing the order data for fulfillment in a time based manner. The order data is preferably organized and managed by the order generating unit 14 so as to optimize the selection or picking of the items in the customer order and then shipping the items to the customer. The order generating unit 14 then transmits the order fulfillment instructions or data to a bulk pick order fulfillment unit 18 to generate a bulk pick recipe, step 182.

The automated fulfillment system 16 can receive bulk pick instructions from the bulk pick order fulfillment unit 18 and perform an automated picking of items to fulfill a customer order, step 184. As described above, the order generating unit 14 can be configured to group together a set of customer orders that share similar features into a larger bulk pick order, and then the bulk pick order data can be transmitted to the bulk pick order fulfillment unit 18. The bulk pick orders (e.g., a bulk order wave) are groupings of customer orders that may be picked or fulfilled in a warehouse in aggregate. The bulk pick orders are selected to optimize the fulfillment process by selecting orders that have certain features in common. The bulk pick order fulfillment unit 18 generates bulk pick tour data corresponding to one or more bulk pick tours that can be fulfilled by the automated fulfillment system 16.

The automated fulfillment system 16 can pick the selected bulk pick items and then place them in one or more totes or container elements. The totes are then conveyed by the conveyor system to the packing and shipping subsystem, step 186.

For items within the customer order that are not located in the automated fulfillment system 16, the system 10 via the bulk pick order fulfillment unit 18 can generate a bulk pick recipe and a bulk pick sheet for dissemination to a pick agent, as described above.

Figure 15:
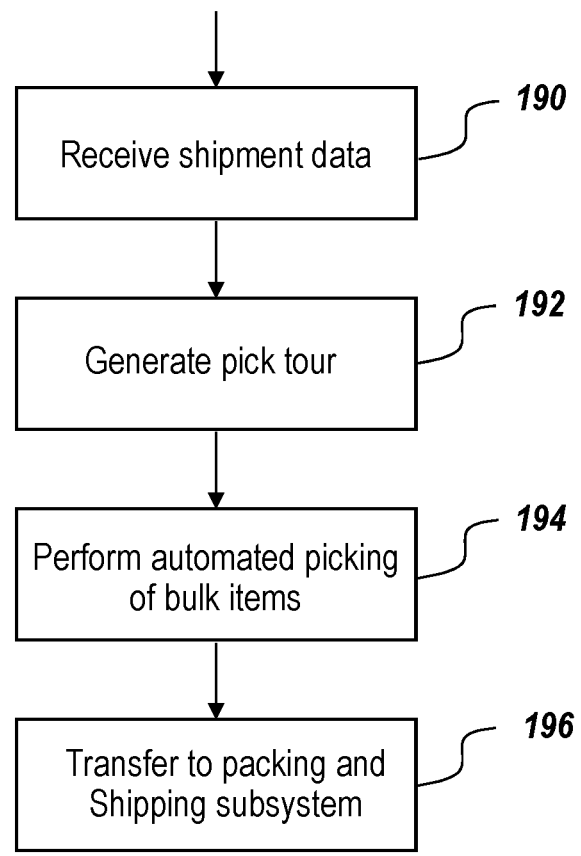
FIG. 15 is a schematic flow chart diagram illustrating the steps involved with picking items from a customer order via a pick tour by employing the automated fulfillment system according to the teachings of the present invention.

With reference to FIG. 15, the order fulfillment system 10 can generate and send instructions to the automated fulfillment system 16 to perform non-bulk picks. For example, the pick tour generating unit 20 receives information from the order generating unit 14 regarding the customer order information, step 190. The pick tour generating unit 20 then performs a mapping between the customer orders or shipments and warehouse locations in the form of a map, such as a shipment-bay graph. The pick tour generating unit 20 then constructs a pick tour plan and/or schedule for the pick agent, the automated fulfillment system, or both. The pick tour plan 156 is constructed or generated so as to optimize the path distance through the automated system as well as the number of pick tasks that a pick agent can execute when eventually performing the pick tour. The pick tour generating unit 20 then converts the pick plans into pick tours 174, step 192, that are conveyed to the mobile devices of the pick agent, to the automated fulfillment system 16, or to both. The pick tour 174 is an ordered list of tasks to perform, which includes the location, quantity, and specific items to be picked.

The automated fulfillment system 16 then picks the selected items listed in the pick tour 174 and the places the items in one or more tubs, totes or containers, step 194. The tubs or totes are then conveyed by the conveyor system to the packing and shipping subsystem, step 196.

For items within the customer order that are not located in the automated fulfillment system 16, the system 10 via the pick tour generating unit 20 can generate a pick tour plan 156 or a pick tour 174 for dissemination to a pick agent, as described above.

Figure 16:
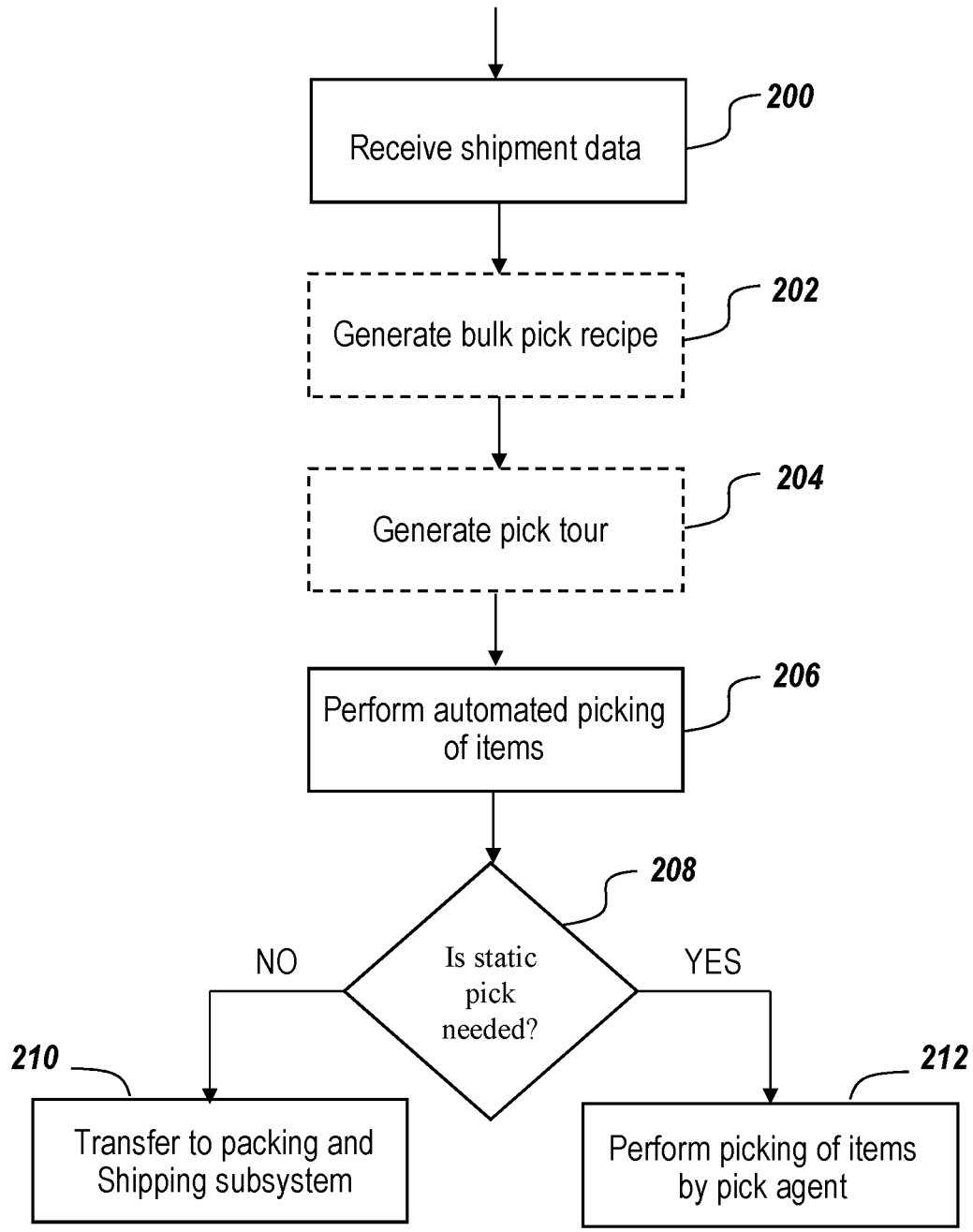
FIG. 16 is a schematic flow chart diagram illustrating the steps involved with picking items from a customer order via a bulk pick recipe and/or a pick tour by employing the automated fulfillment system as well as a pick agent according to the teachings of the present invention.

Further, the order fulfillment system 10 allows for one or more items picked through either the bulk wave process or the pick tour process to be added to items picked by the automated fulfillment system 16 prior to transfer to the packing and shipping subsystem 22. This enables the system 10 to be able to add one or more items not located in the automated fulfillment system to be added to an order that is primarily filled by the automated fulfillment system. For example, as shown in FIG. 16, the customer order collection unit 12 generates customer and order information that is transmitted and received by the order generating unit 14. The order generating unit 14 controls and manages the order data for fulfillment in a time based manner, step 200. The order generating unit 14 then transmits the order fulfillment instructions or data optionally or alternatively to either or both the bulk pick order fulfillment unit 18 to generate a bulk pick recipe, step 202, or to the pick tour generating unit 20, step 204, for generating a pick tour. The steps 202 and 204 are shown in phantom to represent that either or both are optional steps. The order fulfillment system 10 then transfers either or both the bulk pick recipe or the pick tour plan 156 to the automated fulfillment system 16 to automatically pick or retrieve the selected customer items, step 206. Once the automated system selects one or more of the customer items, the system determines whether an item in the bulk tour or the pick tour is located in the warehouse and not in the automated fulfillment system. Specifically, the system 10 determines if a static pick is needed, step 208. If a static pick is not needed, and hence all of the customer items are found within the automated fulfillment system and are retrieved, then the system transfers or conveys the items to the packing and shipping subsystem 22, step 210. However, if one or more items are located outside of the automated fulfillment system and hence one or more static picks are needed, then the system 10 generates either a bulk tour recipe or a pick tour that is conveyed to the handheld device of the pick agent. The pick agent retrieves the selected one or more customer items from the bays in the shelving in the warehouse, step 212. The items are eventually combined with the items picked by the automated fulfillment system. When there are no additional items required to be picked, the items are conveyed or transferred to the packing and shipping subsystem 22.

Exemplary Hardware

Following below and referenced above are more detailed descriptions of various concepts and associated hardware of the units of the order fulfillment system 10 of the present invention. It should be appreciated that various concepts introduced above and discussed in greater detail below may be implemented in any number of ways, as the disclosed concepts are not limited to any particular manner of implementation. Examples of specific implementations and applications are provided below primarily for illustrative purposes and for providing or describing the operating environment of the order fulfillment system of the present invention.

Figure 18:
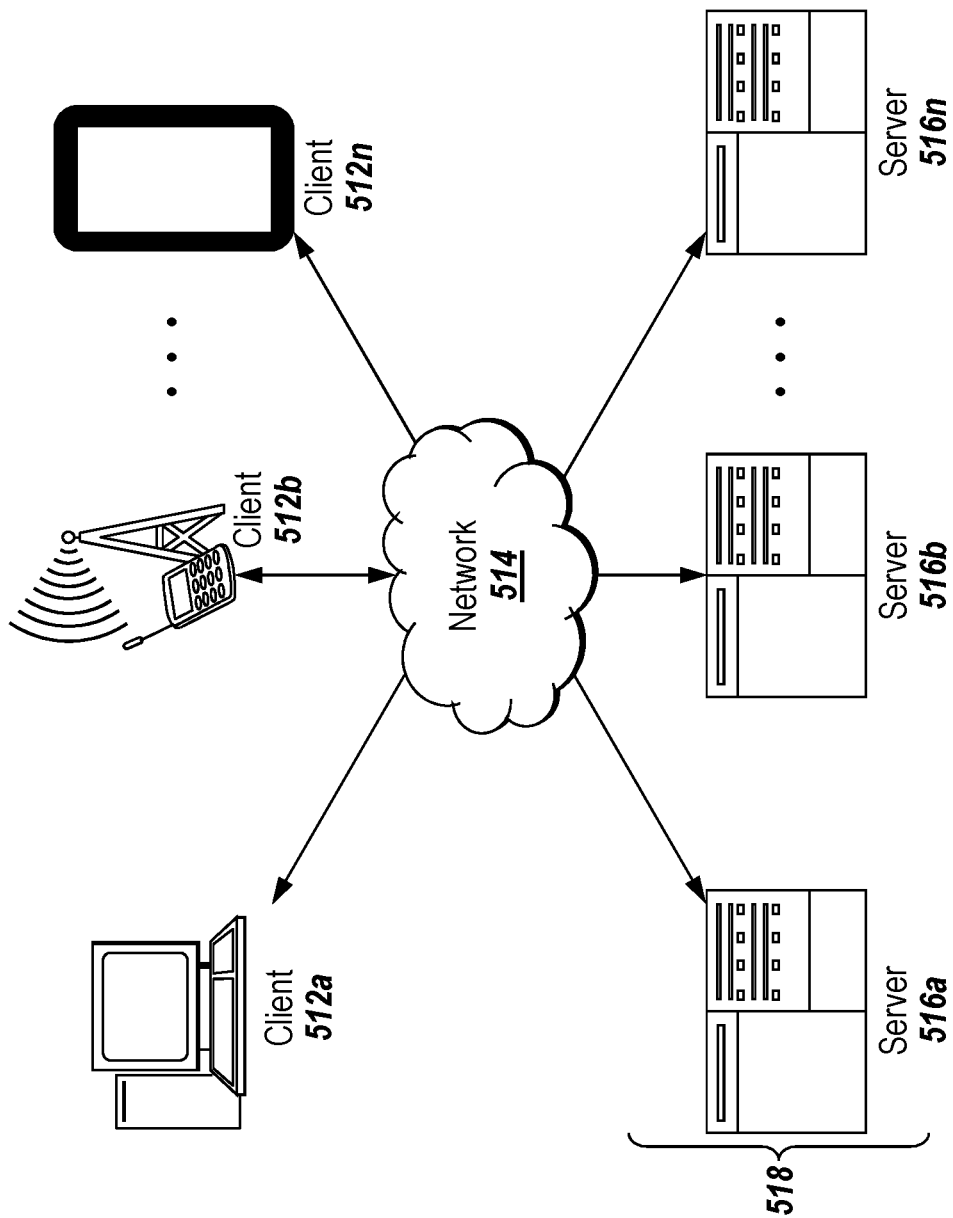
FIG. 18 is a schematic block diagram depicting an embodiment of a network environment comprising client devices in communication with servers through a network arrangement.

Consistent with the foregoing inventive embodiments, it is helpful to describe aspects of the operating environment as well as associated system components (e.g., hardware elements) in connection with the methods and systems described herein. For example, the order fulfillment system 10 of the present invention and associated sub-systems and units, including for example the order collection unit 12, the order generating unit 14, the automated fulfillment system 16, the bulk pick order fulfillment unit 18, the packing and shipping sub-system 22, the pick tour generating unit 20, the database 24, and any other hardware devices including handheld scanners and printers, can be coupled together in a network environment. Further, any system unit or combination of units can be consolidated on a single hardware device. For example, as shown in FIG. 18, a typical network environment can include hardware devices such as one or more clients 512a-512n (also generally referred to as local machine(s) 512, client(s) 512, client node(s) 512, client machine(s) 512, client computer(s) 512, client device(s) 512, endpoint(s) 512, or endpoint node(s) 512) in communication with one or more servers 516a-516n (also generally referred to as server(s) 516, node 516, or remote machine(s) 516) and databases via one or more networks 514. In some embodiments, a client 512 has the capacity to function as both a client node seeking access to resources provided by a server and as a server providing access to hosted resources for other clients 512a-512n. The clients can be any suitable electronic or computing device, including for example, a computer, a server, a smartphone, a smart electronic pad, a portable computer, and the like, such as the computing device 600. The various units 12, 14, 18, 20 and database 24 of the order fulfillment system 10 of the present invention can be implemented as a client device 512 and/or a server 516. The sub-systems 16 and 22 of the system 10 can communicate with the remainder of the system 10 via the network 514. Although FIG. 18 shows a network 514 between the clients 512 and the servers 516, the clients 512 and the servers 516 may be on the same network 514. In some embodiments, there are multiple networks 514 between the clients 512 and the servers 516. In one of these embodiments, a network 514' (not shown) may be a private network and a network 514 may be a public network. In another of these embodiments, a network 514 may be a private network and a network 514' a public network. In still another of these embodiments, networks 514 and 514' may both be private networks.

The network 514 may be connected via wired or wireless links. Wired links may include Digital Subscriber Line (DSL), coaxial cable lines, or optical fiber lines. The wireless links may include BLUETOOTH, Wi-Fi, NFC, RFID Worldwide Interoperability for Microwave Access (WiMAX), an infrared channel or satellite band. The wireless links may also include any cellular network standards used to communicate among mobile devices, including standards that qualify as 1G, 2G, 3G, 4G, or 5G. The network standards may qualify as one or more generations of mobile telecommunication standards by fulfilling a specification or standards such as the specifications maintained by the International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 514 may be any type and/or form of network. The geographical scope of the network 514 may vary widely and the network 514 can be a body area network (BAN), a personal area network (PAN), a local-area network (LAN), e.g. Intranet, a metropolitan area network (MAN), a wide area network (WAN), or the Internet. The topology of the network 514 may be of any form and may include, e.g., any of the following: point-to-point, bus, star, ring, mesh, or tree. The network 514 may be an overlay network, which is virtual and sits on top of one or more layers of other networks 514'. The network 514 may be of any such network topology as known to those ordinarily skilled in the art capable of supporting the operations described herein. The network 514 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 514 may be a type of a broadcast network, a telecommunications network, a data communication network, or a computer network.

In some embodiments, the network system may include multiple, logically-grouped servers 516. In one of these embodiments, the logical group of servers may be referred to as a server farm 518 or a machine farm 518. In another of these embodiments, the servers 516 may be geographically dispersed. In other embodiments, a machine farm 518 may be administered as a single entity. In still other embodiments, the machine farm 518 includes a plurality of machine farms 518. The servers 516 within each machine farm 518 can be heterogeneous, and one or more of the servers 516 or machines 516 can operate according to one type of operating system platform (e.g., WINDOWS NT, manufactured by Microsoft Corp. of Redmond, Wash.), while one or more of the other servers 516 can operate according to another type of operating system platform (e.g., Unix, Linux, or Mac OS X).

In one embodiment, servers 516 in the machine farm 518 may be stored in high-density rack systems, along with associated storage systems, and located in an enterprise data center. In this embodiment, consolidating the servers 516 in this way may improve system manageability, data security, the physical security of the system, and system performance by locating servers 516 and high performance storage systems on localized high performance networks. Centralizing the servers 516 and storage systems and coupling them with advanced system management tools allows more efficient use of server resources.

The servers 516 of each machine farm 518 do not need to be physically proximate to another server 516 in the same machine farm 518. Thus, the group of servers 516 logically grouped as a machine farm 518 may be interconnected using a wide-area network (WAN) connection or a metropolitan-area network (MAN) connection. For example, a machine farm 518 may include servers 516 physically located in different continents or different regions of a continent, country, state, city, campus, or room. Data transmission speeds between servers 516 in the machine farm 518 can be increased if the servers 516 are connected using a local-area network (LAN) connection or some form of direct connection. Additionally, a heterogeneous machine farm 518 may include one or more servers 516 operating according to a type of operating system, while one or more other servers 516 execute one or more types of hypervisors rather than operating systems. In these embodiments, hypervisors may be used to emulate virtual hardware, partition physical hardware, virtualized physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 518 may be de-centralized. For example, one or more servers 516 may comprise components, subsystems and modules to support one or more management services for the machine farm 518. In one of these embodiments, one or more servers 516 provide functionality for management of dynamic data, including techniques for handling failover, data replication, and increasing the robustness of the machine farm 518. Each server 516 may communicate with a persistent store and, in some embodiments, with a dynamic store.

Server 516 may be a file server, application server, web server, proxy server, appliance, network appliance, gateway, gateway server, virtualization server, deployment server, SSL VPN server, or firewall, or any other suitable computing device, such as computing device 600. In one embodiment, the server 516 may be referred to as a remote machine or a node. In another embodiment, a plurality of nodes may be in the path between any two communicating servers. The units 12, 14, 18 and 20 of the order fulfillment system 10, FIG. 1, as well as the warehouse map unit 120, cart building unit 128 and the graph generating unit 124 of the present invention can be stored or implemented on one or more of the servers 516 or clients 512, and the hardware associated with the server or client, such as the processor or CPU and memory.

Figure 19:
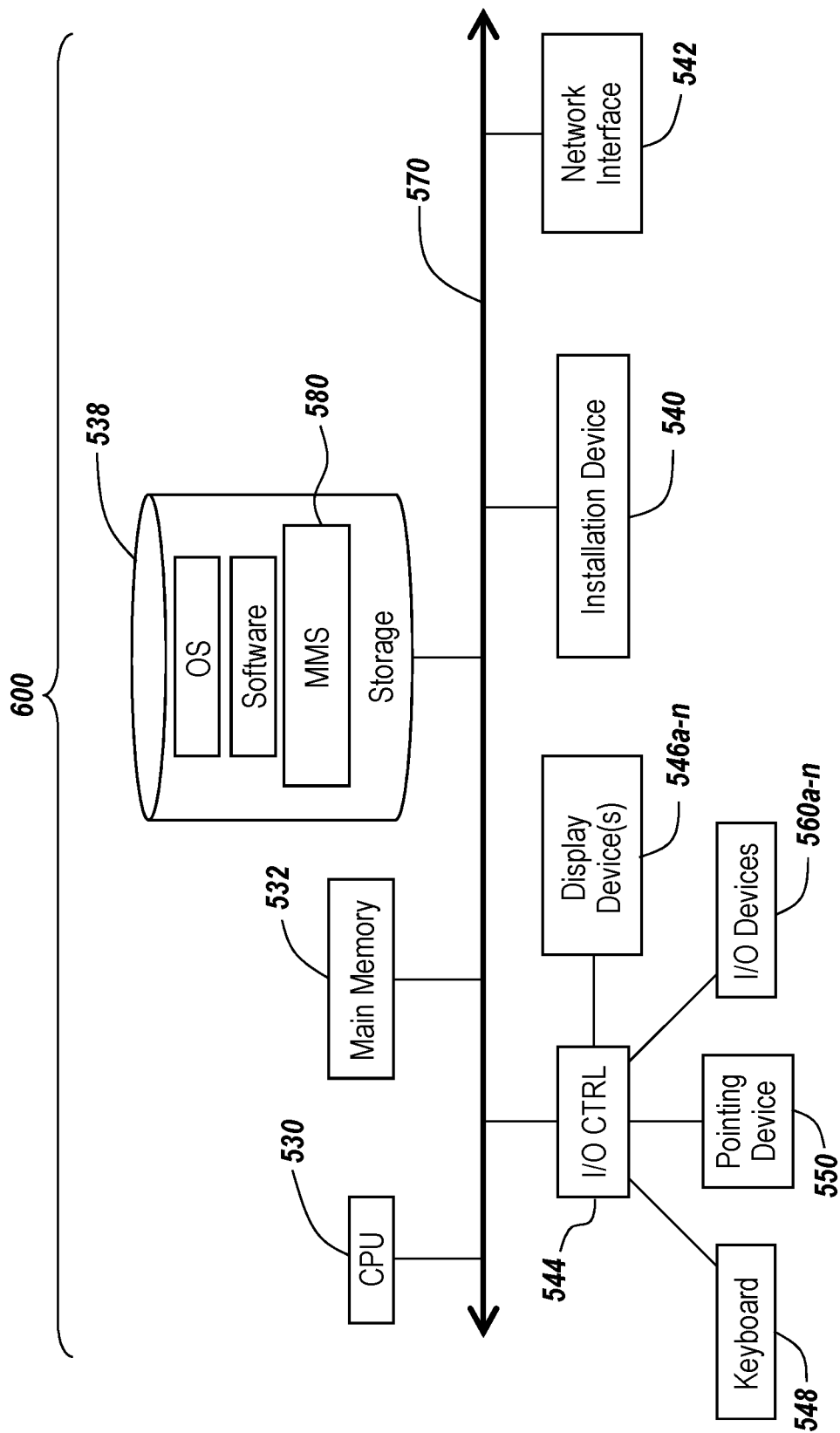
FIGS. 19 and 20 are schematic block diagrams depicting embodiments of computing devices useful for the methods and systems described herein.
Figure 20:
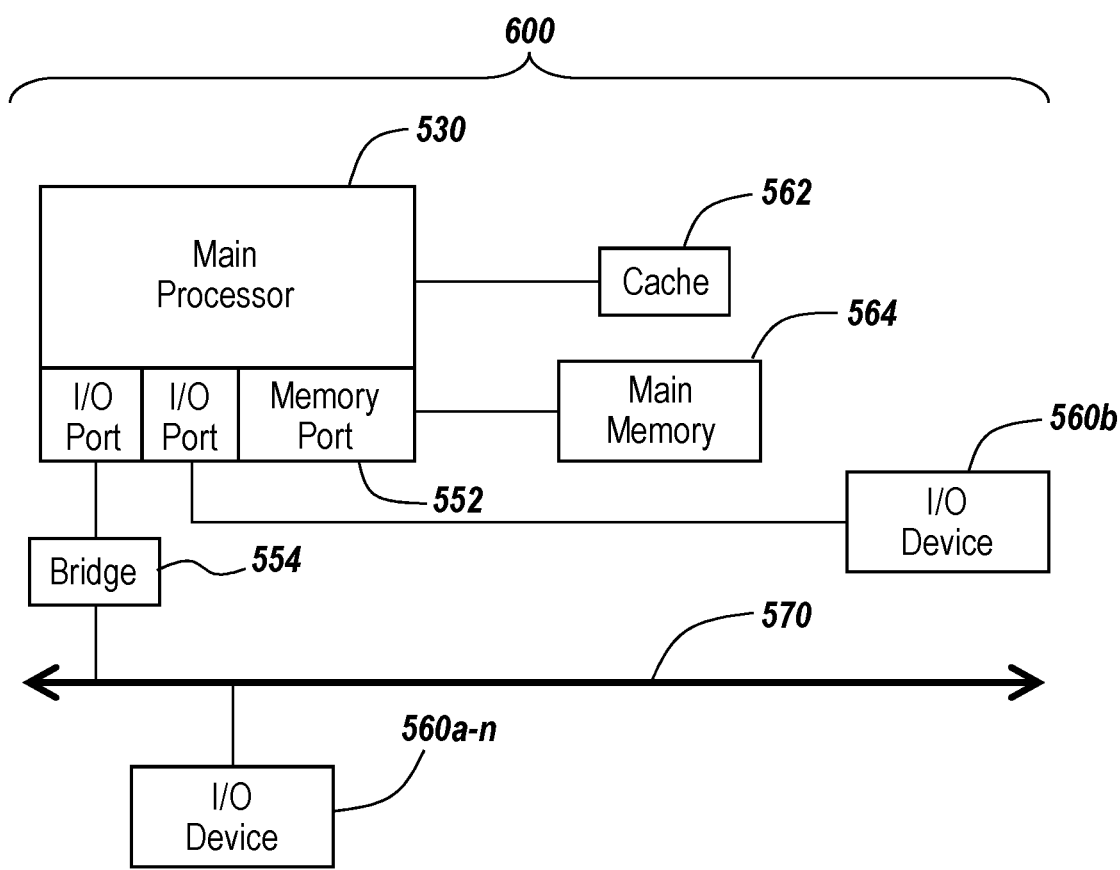

The client 512 and server 516 may be deployed as and/or executed on any type and form of computing device, such as for example a computer, network device or appliance capable of communicating on any type and form of network and performing the operations described herein. FIGS. 19 and 20 depict block diagrams of a computing device 600 useful for practicing an embodiment of the client 512 and/or a server 516, and thus by extension any unit or combination of units 12, 14, 18 and 20 of the order fulfillment system 10 of the present invention. As shown in FIGS. 19 and 20, each computing device 600 includes a central processing unit 530, and a main memory unit 532. As shown in FIG. 19, a computing device 600 may include a storage device 538, an installation device 540, a network interface 542, an I/O controller 544, display devices 546*a*-546*n*, a keyboard 548 and a pointing device 550, e.g. a mouse. The storage device 538 may include, without limitation, an operating system, and/or software. As shown in FIG. 20, each computing device 600 may also include additional optional elements, e.g. a memory port 552, a bridge 554, one or more input/output devices 560*a*-560*n* (generally referred to using reference numeral 560), and a cache memory 562 in communication with the central processing unit 530.

The central processing unit 530 is any logic circuitry that responds to and processes instructions fetched from the main memory unit 564. In many embodiments, the central processing unit 530 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 600 may be based on any of these processors, or any other processor capable of operating as described herein. The central processing unit 530 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit or main memory storage unit 564 may include one or more memory chips capable of storing data and allowing any storage location to be directly accessed by the processor 530. The main memory unit 564 may be volatile and faster than memory of the storage unit 538. Main memory units 564 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 564 or the storage 538 may be non-volatile, e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 564 may be based on any of the above described memory chips, or any other available memory chips capable of operating as described herein. In the embodiment shown in FIG. 19, the processor 530 communicates with main memory 532 via a system bus 570 (described in more detail below). FIG. 20 depicts an embodiment of a computing device 600 in which the processor communicates directly with main memory 564 via a memory port 552. For example, in FIG. 20 the main memory 564 may be DRDRAM. The computer executable instructions of the present invention may be provided using any computer-readable media that is accessible by the computing or electronic device 600. Computer-readable media may include, for example, the computer memory or storage unit 564, 538 described above. The computer storage media may also include, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer readable storage media does not include communication media. Therefore, a computer storage or memory medium should not be interpreted to be a propagating signal per se or stated another transitory in nature. The propagated signals may be present in a computer storage media, but propagated signals per se are not examples of computer storage media, which is intended to be non-transitory. Although the computer memory or storage unit 564, 538 is shown within the computing device 600 it will be appreciated that the storage may be distributed or located remotely and accessed via a network or other communication link.

FIG. 20 depicts an embodiment in which the main processor 530 communicates directly with cache memory 562 via a secondary bus, sometimes referred to as a backside bus. In other embodiments, the main processor 530 communicates with cache memory 562 using the system bus 570. Cache memory 562 typically has a faster response time than main memory 564 and is typically provided by SRAM, B SRAM, or EDRAM. In the embodiment shown in FIG. 20, the processor 530 communicates with various I/O devices 560 via a local system bus 570. Various buses may be used to connect the central processing unit 530 to any of the I/O devices 560, including a PCI bus, a PCI-X bus, or a PCI-Express bus, or a NuBus. For embodiments in which the I/O device is a video display 546, the processor 530 may use an Advanced Graphics Port (AGP) to communicate with the display 546 or the I/O controller 544 for the display 546. FIG. 20 depicts an embodiment of a computer 600 in which the main processor 530 communicates directly with I/O device 560b or other processors 530 via HYPERTRANSPORT, RAPIDIO, or INFINIBAND communications technology. FIG. 20 also depicts an embodiment in which local busses and direct communication are mixed: the processor 530 communicates with I/O device 560a using a local interconnect bus while communicating with I/O device 560b directly.

A wide variety of I/O devices 560a-560n may be present in the computing device 600. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, and printers such as inkjet printers, laser printers, and 3D printers.

Devices 560a-560n may include a combination of multiple input or output devices, including, e.g., Microsoft KINECT, Nintendo Wiimote for the WII, Nintendo WII U GAMEPAD, or Apple IPHONE. Some devices 560a-560n allow gesture recognition inputs through combining some of the inputs and outputs. Some devices 560a-560n provides for facial recognition which may be utilized as an input for different purposes including authentication and other commands. Some devices 560a-560n provides for voice recognition and inputs, including, e.g., Microsoft KINECT, SIRI for IPHONE by Apple, Amazon Alexa, Google Now or Google Voice Search.

Additional devices 560a-560n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXEL SENSE or Multi-Touch Collaboration Wall, may have larger surfaces, such as on a table-top or on a wall, and may also interact with other electronic devices. Some I/O devices 560a-560n, display devices 546a-546n or group of devices may be augment reality devices. The I/O devices may be controlled by an I/O controller 44 as shown in FIG. 19. The I/O controller may control one or more I/O devices, such as, e.g., a keyboard 548 and a pointing device 550, e.g., a mouse or optical pen. Furthermore, an I/O device may also provide storage and/or an installation medium 540 for the computing device 600. In still other embodiments, the computing device 600 may provide USB connections (not shown) to receive handheld USB storage devices. In further embodiments, an I/O device 560 may be a bridge between the system bus 570 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 546a-546n may be connected to I/O controller 544. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 546a-546n may also be a head-mounted display (HMD). In some embodiments, display devices 546a-546n or the corresponding I/O controllers 544 may be controlled through or have hardware support for OPENGL or DIRECTX API or other graphics libraries.

In some embodiments, the computing device 600 may include or connect to multiple display devices 546a-546n, which each may be of the same or different type and/or form. As such, any of the I/O devices 560a-560n and/or the I/O controller 544 may include any type and/or form of suitable hardware, software, or combination of hardware and software to support, enable or provide for the connection and use of multiple display devices 546a-546n by the computing device 600. For example, the computing device 600 may include any type and/or form of video adapter, video card, driver, and/or library to interface, communicate, connect or otherwise use the display devices 546a-546n. In one embodiment, a video adapter may include multiple connectors to interface to multiple display devices 546a-546n. In other embodiments, the computing device 600 may include multiple video adapters, with each video adapter connected to one or more of the display devices 546a-546n. In some embodiments, any portion of the operating system of the computing device 600 may be configured for using multiple displays 546a-546n. In other embodiments, one or more of the display devices 546a-546n may be provided by one or more other computing devices 600a or 600b connected to the computing device 600, via the network 514. In some embodiments software may be designed and constructed to use another computer's display device as a second display device 546a for the computing device 600. For example, in one embodiment, an Apple iPad may connect to a computing device 600 and use the display of the device 600 as an additional display screen that may be used as an extended desktop. One ordinarily skilled in the art will recognize and appreciate the various ways and embodiments that a computing device 600 may be configured to have multiple display devices 546a-546n.

Referring again to FIG. 19, the computing device 600 may comprise a storage device 538 (e.g. one or more hard disk drives or redundant arrays of independent disks) for storing an operating system or other related software, and for storing application software programs such as any program related to the software 580 for the order fulfillment system 10 of the present invention. Examples of storage devices 538 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. The storage device 538 may be non-volatile, mutable, or read-only. The storage device 538 may be internal and connect to the computing device 600 via a bus 570. Further, the storage device 538 may be external and connect to the computing device 600 via an I/O device 560 that provides an external bus. Some storage devices 538 may connect to the computing device 600 via the network interface 542 over a network 514, including, e.g., the Remote Disk for MACBOOK AIR by Apple. Some client devices 512 may not require a non-volatile storage device 538 and may be thin clients or zero clients 512. The storage device 538 may also be used as an installation device 540, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

The computing device 600 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 512. An application distribution platform may include a repository of applications on a server 516 or a cloud 520, which the clients 512a-512n may access over a network 514. An application distribution platform may include application developed and provided by various developers. A user of a client device 512 may select, purchase and/or download an application via the application distribution platform.

Furthermore, the computing device 600 may include a network interface 542 to interface to the network 514 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 600 communicates with other computing devices 600' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 542 may comprise a built-in network adapter, network interface card, PCMCIA network card, EXPRESSCARD network card, card bus network adapter, wireless network adapter, USB network adapter, modem or any other device suitable for interfacing the computing device 600 to any type of network capable of communication and performing the operations described herein.

The computing device 600 of the sort depicted in FIG. 19 may operate under the control of an operating system, which controls scheduling of tasks and access to system resources. The computing device 600 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOK S.

The computer system 600 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 600 has sufficient processor power and memory capacity to perform the operations described herein. In some embodiments, the computing device 600 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 600 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 600 is a portable media player or digital audio player supporting file formats including, but not limited to, MP3, WAV, M4A/AAC, WMA Protected AAC, AIFF, Audible audiobook, Apple Lossless audio file formats and .mov, .m4v, and .mp4 MPEG-4 (H.264/MPEG-4 AVC) video file formats.

In some embodiments, the computing device 600 is a tablet e.g. the IPAD line of devices by Apple; GALAXY TAB family of devices by Samsung; or KINDLE FIRE, by Amazon.com, Inc. of Seattle, Wash. In other embodiments, the computing device 600 is an eBook reader, e.g. the KINDLE family of devices by Amazon.com, or NOOK family of devices by Barnes & Noble, Inc. of New York City, N.Y.

In some embodiments, the computing device 600 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc; or a Motorola DROID family of smartphones. In yet another embodiment, the computing device 600 is a laptop or desktop computer equipped with a web browser and a microphone and speaker system, e.g. a telephony headset. In these embodiments, the computing devices 600 are web-enabled and can receive and initiate phone calls. In some embodiments, a laptop or a desktop computer is also equipped with a webcam or other video capture device that enables video chat and video call. In some embodiments, the computing device 600 is a wearable mobile computing device including but not limited to Google Glass and Samsung Gear.

In some embodiments, the status of one or more machines 512, 516 in the network 514 is monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the order fulfillment system disclosed herein.

The foregoing description may provide illustration and description of various embodiments of the invention, but is not intended to be exhaustive or to limit the invention to the precise form disclosed. Modifications and variations of the order fulfillment system of the present invention may be possible in light of the above teachings or may be acquired from practice of the invention. For example, while a series of acts has been described above, the order of the acts may be modified in other implementations consistent with the principles of the invention. Further, non-dependent acts may be performed in parallel.

In addition, one or more implementations consistent with principles of the invention may be implemented using one or more devices and/or configurations other than those illustrated in the Figures and described in the Specification without departing from the spirit of the invention. One or more devices and/or components may be added and/or removed from the implementations of the figures depending on specific deployments and/or applications. Also, one or more disclosed implementations may not be limited to a specific combination of hardware. Furthermore, certain portions of the invention may be implemented as logic that may perform one or more functions. This logic may include hardware, such as hardwired logic, an application-specific integrated circuit, a field programmable gate array, a microprocessor, software, or a combination of hardware and software.

No element, act, or instruction used in the description of the invention should be construed critical or essential to the invention unless explicitly described as such. Also, as used herein, the article "a" is intended to include one or more items. Where only one item is intended, the term "a single" or similar language is used. Further, the phrase "based on," as used herein is intended to mean "based, at least in part, on" unless explicitly stated otherwise. In addition, the term "user", as used herein, is intended to be broadly interpreted to include, for example, an electronic device (e.g., a workstation) or a user of an electronic device, unless otherwise stated.

Further, the invention can be employed using any combination of features or elements as described above, and are not limited to the current recited steps or features.

It is intended that the invention not be limited to the particular embodiments disclosed above, but that the invention will include any and all particular embodiments and equivalents falling within the scope of the following appended claims.

We claim:

1. A customer order fulfillment system, comprising
an order collection unit for collecting information associated with a plurality of customer orders from a plurality of customers and generating customer order data that includes data associated with each of the plurality of customer orders and the plurality of customers, wherein each of the plurality of customer order includes one or more items associated therewith,
an order generating unit for receiving the customer order data from the order collection unit and generating in response thereto consolidated order fulfillment data,
a pick tour generating subsystem for receiving the consolidated order fulfillment data from the order generating unit and in response thereto generating pick instructions associated with a pick tour or a pick tour plan from the consolidated order fulfillment data, wherein the pick tour generating subsystem comprises
  a map unit for storing a map having data associated therewith that corresponds to a location for each of the items in a warehouse,
  a graph generating unit for generating a value sorted tree graph by employing a value sorted tree mapping technique based on the map data and the consolidated order fulfillment data, and wherein the value sorted tree graph includes data associating one or more of the items from the plurality of a customer orders with a selected location in the warehouse, and
  a pick tour generator for generating the pick tour plan having the pick instructions based on the value ordered tree graph and the map data,
a bulk pick order fulfillment unit for receiving the consolidated order fulfillment data from the order generating unit and grouping together similar ones of the items associated with the plurality of customer orders to form a plurality of bulk picks, wherein one or more of the plurality of bulk picks can form part of one or more bulk pick tours, wherein the bulk pick order fulfillment unit groups selected ones of the items of the plurality of customer orders in the consolidated order fulfillment data into the bulk picks based on a plurality of selectable predetermined logical parameters, including warehouse data and data associated with the items that are common among a selected group of items, so as to optimize a fulfillment process,
wherein the bulk pick order fulfillment unit includes processing hardware that is configured to generate one or more bulk picks having associated therewith a plurality of bulk pick recipes from the data associated with the customer orders and the warehouse data including one or more locations in the warehouse, wherein each of the bulk pick recipes includes a selected quantity of different ones of the one or more items from different ones of the plurality of customer orders that are grouped together; and
an automated fulfillment system for receiving the consolidated order fulfillment data from the order generating unit and for automatically selecting one or more of the items in the customer order that are store in one or more of a plurality of storage receptacles,
wherein the automated fulfillment system is configured for receiving the pick tour plan or the pick tour and for automatically selecting the items in the customer order set forth in the pick tour plan or the pick tour from the one or more carousels, and is configured for receiving one or more of the plurality of bulk picks for automatically selecting one or more of the items in the customer order from the one or more carousels.

2. The customer order fulfillment system of claim 1, wherein the pick tour generating subsystem further comprises
a cart building unit for generating information associated with a mobile cart for use by a pick agent, wherein the mobile cart has a plurality of totes associated therewith and wherein each of the plurality of totes includes identification information,
wherein the pick instructions of the pick tour plan correlates items of the customer orders at multiple selected locations in the warehouse with one or more of the plurality of totes in the mobile cart,
wherein the cart building unit determines the number of the totes for the mobile cart and the identification information associated with each of the plurality of totes based on the pick tour plan.

3. The customer order fulfillment system of claim 1, wherein one or more of the plurality of totes includes a plurality of sub-compartments, wherein each of the plurality of sub-compartments includes identification information.

4. The customer order fulfillment system of claim 3, wherein the plurality of totes are arranged on the mobile cart according to the pick tour plan.

5. The customer order fulfillment system of claim 4, wherein the value sorted tree graph is an associative array data type having values associated therewith, wherein the value sorted tree graph sorts the values in a selected order.

6. The customer order fulfillment system of claim 5, wherein the values correspond to the locations in the warehouse or to a number of the items at the locations in the warehouse.

7. The customer order fulfillment system of claim 6, wherein the locations within the warehouse include one or more bays associated with each location in the warehouse, and wherein the pick tour plan comprises plan data correlating the location of the bay with selected ones of the items at the locations of the bays to be placed in selected totes in the mobile cart.

8. The customer order fulfillment system of claim 2, wherein the pick tour plan is generated by the pick tour generator by mapping the consolidated order fulfillment data generated by the order generating unit with the warehouse configuration stored in the map unit via the graph generating unit.

9. The customer order fulfillment system of claim 7, wherein the pick tour generator converts the pick tour plan into a pick tour, wherein the pick instructions of the pick tour includes an ordered list of pick tasks.

10. The customer order fulfillment system of claim 9, wherein each of the pick tasks includes a plurality of: the location of the bay, identification information associated with the location of the bay, shipping information associated with one or more of the customer orders, a quantity of the items, identification information associated with each of the items, one or more of the items to be picked from the bay, and the tote on the mobile cart in which to place the picked items.

11. The customer order fulfillment system of claim 10, wherein the pick tour generator generates the pick tour based on a similarity in the customer orders and the location of the items in the warehouse.

12. The customer order fulfillment system of claim 1, wherein the bulk pick order fulfillment unit groups the items in the consolidated order fulfillment data into shipments according to one or more predetermined logical parameters.

13. The customer order fulfillment system of claim 12, wherein the processing hardware of the bulk pick order fulfillment unit further configured to:
- map the one or more items in each of the plurality of customer orders to product identification data, and
- generate a bulk pick ticket associated with each of the bulk picks.

14. The customer order fulfillment system of claim 13, wherein the bulk pick ticket includes information about the one or more items in the bulk pick recipe, and location information associated with the location of the one or more items in the warehouse.

15. The customer order fulfillment system of claim 13, wherein the bulk pick order fulfillment unit generates one or more bulk pick recipes by using a connected graph of groupings of the items from the customer orders and the one or more additional items, wherein the items from the customer orders and the additional items form nodes of the connected graph, and wherein the connected graph includes a plurality of connecting lines coupled to one or more of the nodes and which are representative of a number of the customers associated with the nodes that are connected by the connecting lines.

16. The customer order fulfillment system of claim 1, further comprising a packing and shipping sub-system for packing and shipping the items from the customer orders.

17. The customer order fulfillment system of claim 15, wherein one of the order generating unit and the bulk pick order fulfillment unit generates a window having a tree map for visually displaying on a display device selected consolidated order fulfillment data, and wherein the window includes
- a top pane for displaying the tree map further includes a plurality of configurable and the selectable logical parameters for allowing a user to select parameters associated with the customer orders, and wherein the selectable parameters include a plurality of one or more of: a selected selectable warehouse location, the a maximum number of items per bulk pick ticket, the a minimum shipment count per bulk pick recipe, or the a maximum number of recipes per bulk pick, a selectable fulfillment line type, and a selectable pick location, wherein each of the recipes includes a selected number of items from the customer orders, and
- a plurality of bottom panes forming the tree map, wherein each of the plurality of bottom panes is representative of a total number of customer orders included in a bulk pick, and wherein each of the plurality of bottom pane elements has a different size relative to each other and is representative of a different number of bulk picks, wherein the plurality of bottom panes are arranged in order of the number of bulk picks.

18. The system of claim 1, wherein the plurality of storage receptacles comprises a plurality of vertically extending and rotatable carousel units.

19. A method for retrieving items from a customer order from a warehouse so as to fulfill a customer order, comprising
- collecting information associated with a plurality of customer orders from a plurality of customers and generating customer order data that includes data associated with each of the plurality of customer orders and the plurality of customers with an order collection unit, wherein each of the plurality of customer order includes one or more items associated therewith,
- generating in response to the customer order data consolidated order fulfillment data with an order generating unit, and
- receiving the consolidated order fulfillment data and generating pick instructions associated with a pick tour plan or a pick tour from the consolidated order fulfillment data by a pick tour generating subsystem, wherein the pick tour generating subsystem is configured for
  - storing a map having data associated therewith that corresponds to a location for each of the items in a warehouse with a map unit,
  - generating information associated with a mobile caret for use by a pick agent with a cart building unit, wherein the mobile cart has a plurality of totes associated therewith and wherein each of the plurality of totes includes identification information,
  - generating a value sorted tree graph by employing a value sorted tree mapping technique based on the map data and the consolidated order fulfillment data with a graph generating unit, and wherein the value sorted tree graph includes data associating one or more of the items from the plurality of customer orders with a selected location in the warehouse, and
  - generating the pick tour plan having the pick instructions bases on the value ordered tree graph and the map data with a pick tour generator, wherein the pick instructions for the pick tour plan correlates items of the customer orders at multiple selected locations in the warehouse with one or more of the plurality of totes in the mobile cart, wherein the cart building unit determines the number of totes for the mobile cart and the identification information associated with each of the plurality of totes based on the pick tour plan,
- receiving the consolidated order fulfillment data from the order generating unit and grouping together similar ones of the items associated with the plurality of customer orders to form a plurality of bulk picks with a bulk pick order fulfillment unit, wherein one or more of the plurality of bulk picks can form part of one or more bulk pick tours, wherein the pick tour instructions selectively includes the bulk picks, wherein the bulk pick order fulfillment unit groups selects one of the items of the plurality of customer orders in the consolidated order fulfillment data into the bulk picks based on a plurality of selectable predetermined logical parameters, including the map data and data associated with the items that are common among a selected group of items, so as to optimize a fulfillment process,
- wherein the bulk pick order fulfillment until includes processing hardware that is configured for generating one or more bulk picks having associated therewith a plurality of bulk pick recipes from the data associated with the customer orders and the map data including one or more locations in the warehouse, wherein each of the bulk pick recipes includes a selected quantity of different ones of the one or more items from different ones of the plurality of customer orders that are grouped together, and
- receiving the consolidated order fulfillment data from the order generating unit and for automatically selecting one or more of the items in the customer order that are stored in one or more of a plurality of storage receptacles of an automated fulfillment system,
- wherein the automated fulfillment system is configured for receiving the pick tour plan or the pick tour and for selecting the items in the customer order set forth in the pick tour plan or the pick tour from the one or more carousels, and is configured for receiving one or more of the plurality of bulk picks for selecting one or more of the items in the customer order from the one or more carousels.

20. The method of claim 19, wherein the pick tour generating subsystem is further configured for
generating information associated with a mobile cart for use by a pick agent with a cart building unit, wherein the mobile cart has a plurality of totes associated therewith and wherein each of the plurality of totes includes identification information,
wherein the pick tour plan correlates items of the customer orders at multiple selected locations in the warehouse with one or more of the plurality of totes in the mobile cart,
wherein, the cart building unit determines the number of totes for the mobile cart and the identification information associated with each of the plurality of totes based on the pick tour plan.

21. The method of claim 20, further comprising arranging the plurality of totes on the mobile cart according to the pick tour plan.

22. The method of claim 20, wherein the value sorted tree graph is an associative array data type having values associated therewith, wherein the value sorted tree graph sorts the values in a selected order.

23. The method of claim 22, wherein the values correspond to the locations in the warehouse or to a number of the items at selected locations in the warehouse.

24. The method of claim 23, wherein the locations within the warehouse include one or more bays associated with each location in the warehouse, further comprising correlating the location of the bay with selected ones of the items at the locations of the bay to be placed in selected totes in the mobile cart.

25. The method of claim 24, further comprising generating the pick tour plan by mapping the consolidated order fulfillment data generated by the order generating unit with the warehouse configuration stored in the map unit via the graph generating unit.

26. The method of claim 25, further comprising converting with the pick tour generator the pick tour plan into the pick tour having the pick instructions, wherein the pick instructions of the pick tour includes an ordered list of pick tasks.

27. The method of claim 26, wherein each of the pick tasks includes a plurality of: the location of the bay, identification information associated with the location of the bay, shipping information associated with one or more of the customer orders, a quantity of the items, identification information associated with each of the items, one or more of the items to be picked from the bay location, and the tote on the mobile cart in which to place the picked items.

28. The method of claim 19, wherein the bulk pick order fulfillment unit includes processing hardware that is configured for:
mapping the one or more items in each of the plurality of customer orders to product identification data, and
generating bulk pick ticket associated with each of the bulk picks.

29. The method of claim 28, wherein the bulk pick ticket includes information about the one or more items in the bulk pick recipe, and location information associated with the location of the one or more items in the warehouse.

30. The method of claim 28, wherein the bulk pick order fulfillment unit generates one or more bulk pick recipes by using a connected graph of groupings of the items from the customer orders and the one or more additional items, wherein the items from the customer orders and the additional items form nodes of the connected graph, and wherein the connected graph includes a plurality of connecting lines couples to one or more of the nodes and which are representative of a number of the customers associated with the nodes that are connected by the connecting lines.

31. The method of claim 30, further comprising generating a window having a tree map for visually displaying on a display device selected consolidated order fulfillment data, and wherein the window includes
a top pane for displaying the tree map further includes a plurality of configurable and selectable logical parameters for allowing a user to select parameters associated with the customer orders, and wherein the selectable parameters include a plurality of one or more of: a selected warehouse location, a maximum number of items per bulk pick ticket, a minimum shipment count per bulk pick recipe, a maximum number of recipes per bulk pick, a selectable fulfillment line type, and a selectable pick location, wherein each of the recipes includes a selected number of items from the customer orders, and
a plurality of bottom panes forming the tree map, wherein each of the plurality of bottom panes is representative of a total number of customer orders included in a bulk pick, and wherein each of the plurality of bottom pane elements has a different size relative to each other and is representative of a different number of bulk picks, wherein the plurality of bottom panes are arranged in order of the number of bulk picks.

32. A customer order fulfillment system, comprising
an order collection unit for collecting information associated with a plurality of customer orders from a plurality of customers and generating customer order data that includes data associated with each of the plurality of customer orders and the plurality of customers, wherein each of the plurality of customer order includes one or more items associated therewith,
an order generating unit for receiving the customer order data from the order collection unit and generating in response thereto consolidated order fulfillment data,
a pick tour generating subsystem for receiving the consolidated order fulfillment data from the order generating unit and in response thereto generating pick instructions associated with a pick tour or a pick tour plan from the consolidated order fulfillment data,
a bulk pick order fulfillment unit for receiving the consolidated order fulfillment data from the order generating unit and grouping together similar ones of the items associated with the plurality of customer orders to form a plurality of bulk picks, wherein one or more of the plurality of bulk picks can form part of one or more bulk pick tours, and
an automated fulfillment system for receiving the consolidated order fulfillment data from the order generating unit and for automatically selecting one or more of the items in the customer order, wherein the automated fulfillment system includes a plurality of storage receptacles in communication with a conveyor subsystem, wherein each of the plurality of storage receptacles has a plurality of tubs associated therewith for storing selected items, wherein the automated fulfillment system is configured for receiving the pick tour plan or the pick tour and for automatically selecting the items in the customer order set forth in the pick tour plan or the pick tour from one or more of the plurality of storage receptacles, and is configured for receiving one or more of the plurality of bulk picks for automatically selecting one or more of the items in the customer order from the storage receptacles.

33. The system of claim 32, wherein the plurality of storage receptacles comprises a plurality of vertically extending and rotatable carousel units.

* * * * *